United States Patent
Tuthill et al.

(10) Patent No.: US 12,550,867 B2
(45) Date of Patent: Feb. 17, 2026

(54) SCRATCHING APPARATUS

(71) Applicant: HEBE STUDIO LIMITED, Banbury (GB)

(72) Inventors: James Tuthill, Headington (GB); Simon Nicholls, Daventry (GB); Johannes Paul, London (GB); William Windham, Banbury (GB)

(73) Assignee: Hebe Studio Limited, Banbury (GB)

(*) Notice: Subject to any disclaimer, the term of this patent is extended or adjusted under 35 U.S.C. 154(b) by 119 days.

(21) Appl. No.: 17/797,767

(22) PCT Filed: Feb. 4, 2021

(86) PCT No.: PCT/EP2021/052652
§ 371 (c)(1),
(2) Date: Aug. 5, 2022

(87) PCT Pub. No.: WO2021/156358
PCT Pub. Date: Aug. 12, 2021

(65) Prior Publication Data
US 2023/0069026 A1    Mar. 2, 2023

(30) Foreign Application Priority Data
Feb. 5, 2020 (GB) .................................. 2001521

(51) Int. Cl.
*A01K 15/02* (2006.01)
(52) U.S. Cl.
CPC .................. *A01K 15/024* (2013.01)
(58) Field of Classification Search
CPC .................................................. A01K 15/024
(Continued)

(56) References Cited

U.S. PATENT DOCUMENTS 2,997,019 A    8/1961    Bryson
3,993,027 A    11/1976   Mullin
(Continued)

FOREIGN PATENT DOCUMENTS

CN      205813170 U    12/2016
DE   202007000914 U1    4/2007

OTHER PUBLICATIONS

European Patent Office, International Searching Authority; International Search Report; pp. 1-3.
(Continued)

*Primary Examiner* — David J Parsley
*Assistant Examiner* — Sahar Almatrahi
(74) *Attorney, Agent, or Firm* — Finch & Maloney PLLC

(57) ABSTRACT

A scratching apparatus including a support for a scratchable cover. The support includes a plurality of support members and is reconfigurable between first and second states, wherein in the first state a scratchable cover supported by said support is loosely mounted on said support and in the second state the scratchable cover is tensioned around the support. The arrangement is such that reconfiguring the support from the first state to the second state causes at least one of the support members to move relative to another support member to tension the scratchable cover around the support. The support from the second state to the first state causes at least one of the support members to move relative to another support member to loosen the scratchable cover mounted on the support.

12 Claims, 20 Drawing Sheets

(58) Field of Classification Search
USPC .......................................................... 119/706
See application file for complete search history.

(56) References Cited

U.S. PATENT DOCUMENTS

| | | | | |
|---|---|---|---|---|
| 5,275,127 | A * | 1/1994 | Leopold | A01K 15/024 |
| | | | | 119/711 |
| D348,124 | S | 6/1994 | O'Rourke | |
| 5,775,263 | A | 7/1998 | Richards | |
| 6,666,167 | B1 * | 12/2003 | Carlson | A01K 15/024 |
| | | | | 119/706 |
| 2002/0195064 | A1 | 12/2002 | Robertson | |
| 2005/0011469 | A1 | 1/2005 | Lipscomb | |
| 2005/0263096 | A1 * | 12/2005 | Mita | A01K 15/024 |
| | | | | 119/706 |
| 2009/0241852 | A1 * | 10/2009 | Stevens | A01K 15/024 |
| | | | | 119/706 |
| 2011/0253060 | A1 | 10/2011 | Schotthoefer | |
| 2012/0090552 | A1 | 4/2012 | Haaf | |
| 2012/0090553 | A1 | 4/2012 | Haaf | |
| 2012/0312239 | A1 | 12/2012 | Wedertz | |
| 2017/0202181 | A1 | 7/2017 | Hartelius | |
| 2017/0350159 | A1 | 12/2017 | Tuthill | |
| 2019/0246605 | A1 | 8/2019 | Chen | |

OTHER PUBLICATIONS

European Patent Office, International Searching Authority; Written Opinion of the ISA; pp. 1-6.
United Kingdom Intellectual Property Office; Search Report of Application No. GB2009365.4; Dated Nov. 24, 2020; pp. 1.
U.S. Appl. No. 17/351,515; Title: Scratching Apparatus, filed Jun. 18, 2021; First named inventor: James Tuthill.
European Patent Office, International Searching Authority; International Search Report; pp. 1-3; Date of Mailing: May 19, 2021.
European Patent Office, International Searching Authority; Written Opinion of the ISA; pp. 1-6; Date of Mailing: May 19, 2021.

* cited by examiner

SCRATCHING APPARATUS

CROSS-REFERENCE TO RELATED APPLICATIONS

This application claims priority to foreign Application No. GB2001521.0 filed Feb. 5, 2020, the disclosure of which is hereby incorporated by reference herein in its entirety.

FIELD

This disclosure relates to scratching apparatus, also colloquially known as scratching posts, particularly but not exclusively to scratching apparatus for felines such as domestic cats.

BACKGROUND

It is well known that felines such as domestic cats have a natural urge to scratch their claws against rough surfaces. The act of scratching is thought to de-stress cats and make them calmer, as well as having other benefits such as removing old material from their claws and enabling them to mark their territory.

As many cat owners will attest, cats often choose items of furniture such as sofas and table or chair legs to scratch their claws against, and in an attempt to discourage such behaviour many owners purchase scratching apparatus, more usually known as scratching posts. A typical example of a previously proposed scratching post is the "Trixie Parla" 62 cm scratching post sold by Amazon.co.uk. This post comprises a generally rectangular covered base, and a post upstanding from the base that has a sisal rope wound around its' peripheral surface.

Whilst such posts can be effective in encouraging cats to scratch against the post instead of an item of furniture, it is the case that the action of the cat scratching on the sisal rope damages the rope over time and makes the post as a whole less effective. If this should happen, the only recourse for the user is to purchase a new scratching post, which is expensive and unnecessarily wasteful.

To address such issues, it has previously been proposed in U.S. patent application Ser. No. 2002/0195064 to provide scratching apparatus that comprises a base and upstanding post, as per conventional scratching posts, and a removable and hence replaceable scratchable cover that is attached to the post by means of a hook-and-loop fixing system such as Velcro®.

As the scratchable cover of this scratching post is removable and replaceable, users no longer have to discard the entire post when the scratchable surface is worn, and hence waste is reduced. However, as a cat scratches against the cover it pulls the cover against the action of the Velcro® and the cover can become detached from the post, particularly as the Velcro® ages and becomes less effective. It can also be difficult for users to properly fasten the cover to the post and tension the cover around the post, and as a consequence the cover can become wrinkled on the surface of the post thereby rendering it less effective as a scratching post.

The scratching apparatus disclosed herein has been devised with at least some of the aforementioned issues in mind.

SUMMARY

A first embodiment of the present disclosure provides scratching apparatus comprising a support for a scratchable cover, wherein the support comprises a plurality of support members, the support being reconfigurable between first and second states, wherein in said first state a scratchable cover supported by said support is loosely mounted on said support and in said second state said scratchable cover is tensioned around the support, the arrangement being such that reconfiguring said support from said first state to said second state causes at least one of said support members to move relative to another support member to tension the scratchable cover around the support, and reconfiguring said support from said second state to said first state causes at least one of said support members to move relative to another support member to loosen the scratchable cover mounted on the support.

In one implementation, reconfiguring said support from said first state to said second state causes at least one of said support members to move relative to another support member to increase the spacing between the support members and thereby tension the scratchable cover on the support. In another implementation, reconfiguring said support from said second state to said first state causes at least one of said support members to move relative to another support member to reduce the spacing between the support members and thereby relax the scratchable cover mounted on the support.

The scratching apparatus may comprise a base, said support being coupled to said base. The support may comprise a first support member and a second support member.

In one implementation said support is coupled to said base in such a way that said first and second support members can both move relative to said base.

The scratching apparatus may comprise at least one coupling formation for coupling said first support member to said second support member. The coupling formation may be operable to drive the support members apart. The coupling formation may include a wedge for driving the support members apart.

The wedge may be coupled to a retainer in such a way that movement of the wedge away from the retainer enables the support members to be moved closer to one another.

In another implementation, the support may comprise first and second support members coupled together in a clamshell arrangement. In this implementation, reconfiguring the support from said first state to said second state may cause a distance between said first and second support members to reduce. Reconfiguring the support from said second state to said first state may cause a distance between said first and second support members to increase.

In one implementation one of said first and second support members may be configured to be coupled to a rod or pole. The rod or pole may comprise a limb of a cat tree. The rod or pole may be coupled to a base.

Preferably the scratchable cover comprises a panel having first and second faces, said first face comprising a scratchable surface, said second face including first and second couplings connectable, respectively, to said first and second support members to couple the cover to the support.

Another aspect of the present disclosure relates to a scratchable cover configured and arranged for use with scratching apparatus of the type described herein. The cover may be of sisal or carpet material. The cover may be generally tubular.

Another aspect of the present disclosure relates to scratching apparatus comprising first and second support members arranged in a clamshell configuration, the support members comprising fasteners for coupling a scratchable cover to said support members, the apparatus being configured so that movement of one said support towards the other tensions a scratchable cover affixed thereto.

Another aspect of the disclosure relates to scratchable apparatus comprising a support that can be expanded to tension a tubular scratchable cover mounted on said support.

Another aspect of the disclosure relates to scratchable apparatus comprising a pair of support members coupled to one another in a clamshell arrangement and each including a coupling for connection to a coupling on a removable scratchable cover, the arrangement being such that a removable scratchable cover coupled to the support members is automatically tensioned around the support members as one or both of the support members are moved to close the clamshell.

Other features and aspects of the apparatus are disclosed below.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION

Before embarking upon a detailed description of various implementations of the apparatus disclosed herein, it is appropriate to mention that references to orientations (such as "upper", "lower", "top" and "bottom") are intended to refer to the apparatus in normal use, and are not intended to limit the scope of the disclosure—in particular in other circumstances, for example when the apparatus is packaged for sale or transport.

Figure 1:
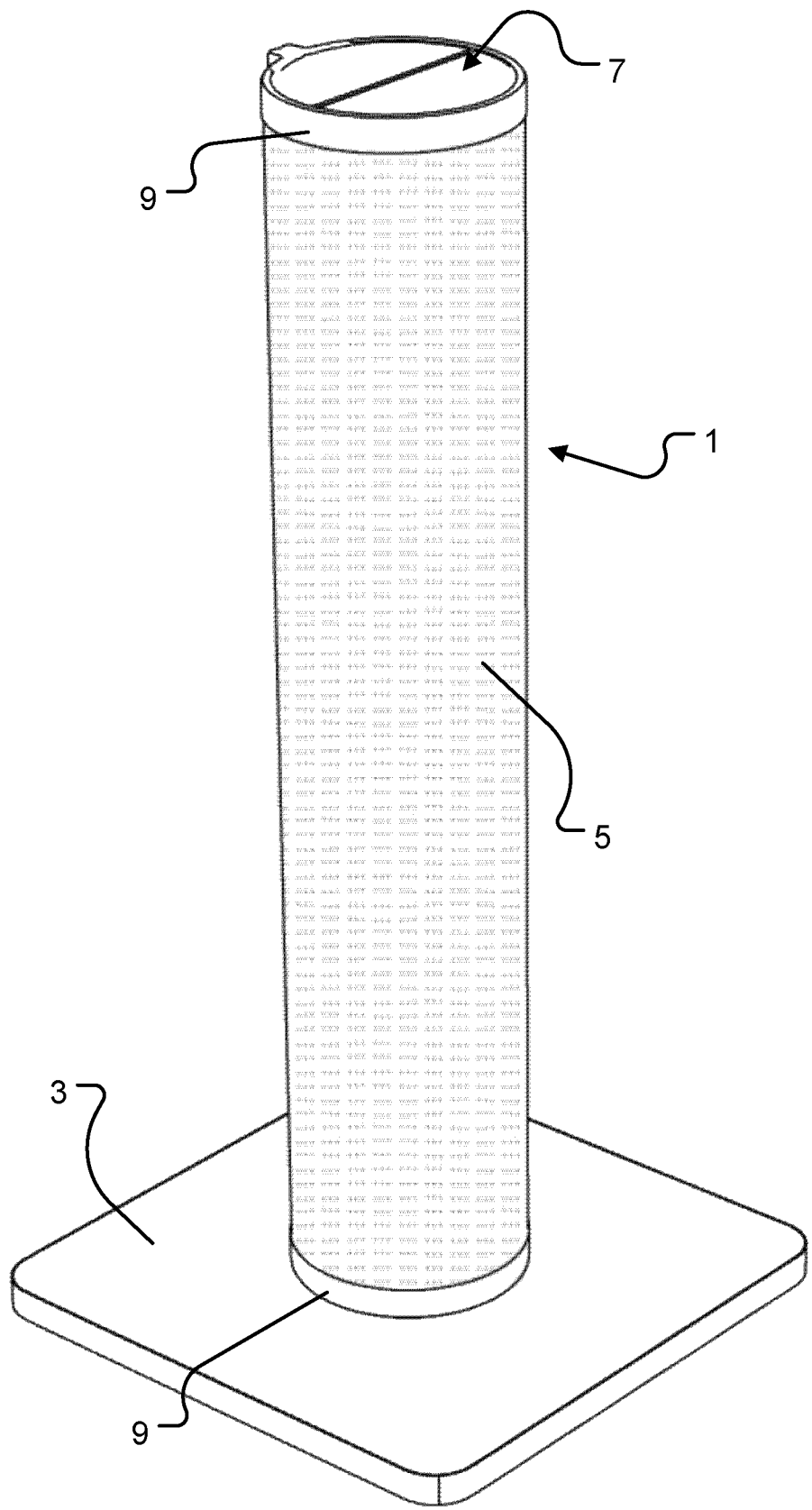
FIG. 1 is a schematic perspective view of one embodiment of scratching apparatus according to the present disclosure.

Referring now to FIG. 1 of the accompanying drawings, there is depicted a schematic perspective view of one embodiment of scratching apparatus 1 according to the present disclosure.

The scratching apparatus comprises a base 3 to which an expandable support (not visible) has been affixed. A replaceable scratchable cover 5 is mounted upon and tensioned by the support, following which a two-part cap 7 has been fitted to the support to hide the internal workings of the support. In the preferred implementation the base is relatively weighty and significantly larger than the support so that a cat, for example, leaning against the scratchable surface is unlikely to cause the apparatus to topple over.

The scratachable cover 5, in this arrangement, comprises a panel of sisal matting that has been formed into a tube and hemmed 9 at either peripheral end to maintain the tubular shape of the cover. As will be appreciated by persons of skill in the art, the scratchable cover need not comprise sisal matting. The cover could, for example, by of any of a number of alternative scratchable materials, for example a panel of carpet or other rough material against which an animal can scratch their claws.

Figure 2:
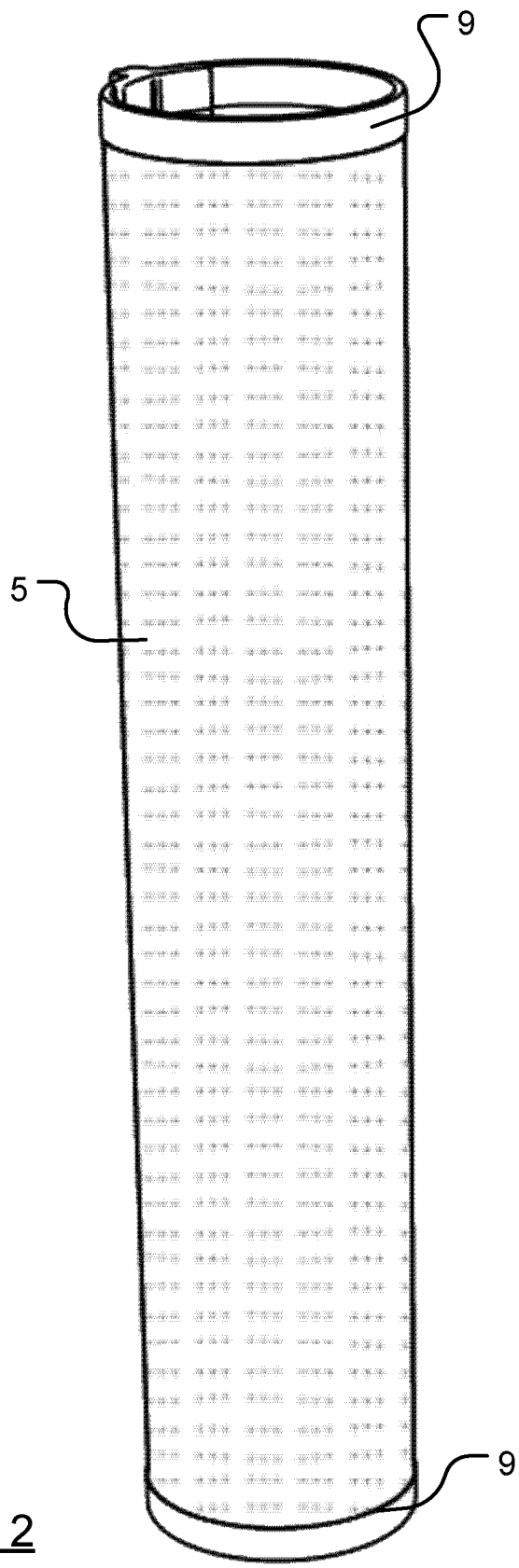
FIG. 2 is a schematic perspective view of a scratchable cover for the apparatus of FIG. 1.

FIG. 2 is a schematic perspective view of the scratchable cover 5 once it has been removed from the apparatus 1 shown in FIG. 1. As aforementioned, the cover 5 in this embodiment comprises a panel of sisal matting that has been formed into a tube, and secured in that configuration by hems 9 at either end of the tube. Adjacent peripheral edges of the panel running between the hems 9 are also joined to one another.

Figure 3:
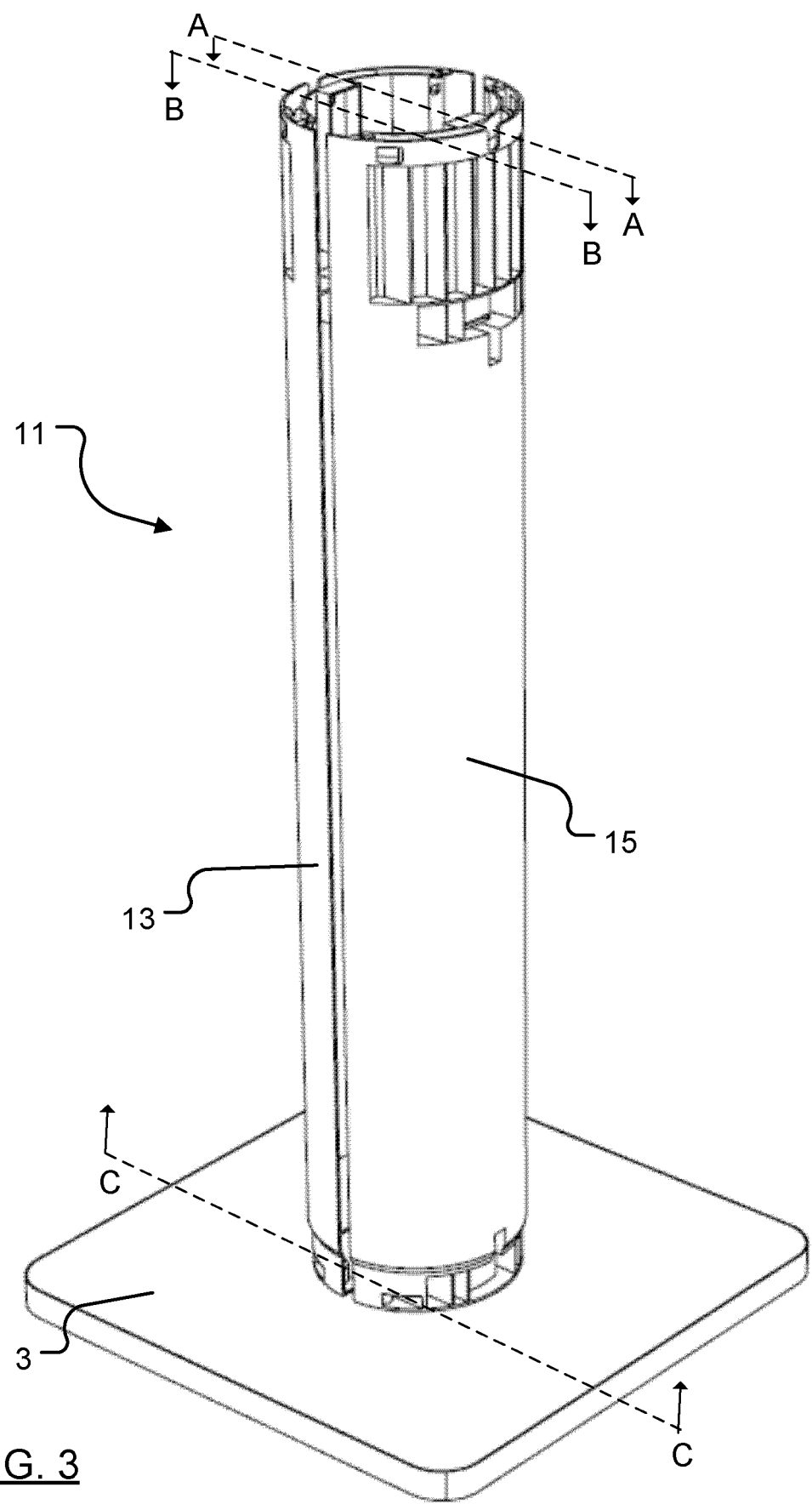
FIG. 3 is a schematic perspective view of a base and expandable support for the apparatus of FIG. 1.

FIG. 3 shows the base 3 and the expandable support 11 of the apparatus, which support 11 is hidden from view in FIG. 1. As shown, the two-part cap 7 has been removed from the support to enable access to be had to the internal components of the support 11.

The support 11 is coupled to the base (in a manner that is later described in detail) so that the respective components of the support can move relative to the base 3 as the support is expanded and contracted. In this particular example, the support comprises two support members 13, 15 that are coupled to one another and to the base in such a manner (which will later be described in detail) that the support members can move relative to one another and the base to increase or reduce the distance between them. In the particular arrangement that is hereafter described, the support is configured so that both support members can move relative to the base. It will be appreciated, however, that equivalent functionality may be achieved by fixing one said support member to the base so that it cannot move, and enabling the other support member to move relative to the fixed support member. Both of these arrangements are intended to be within the scope of the accompanying claims.

Figure 4:
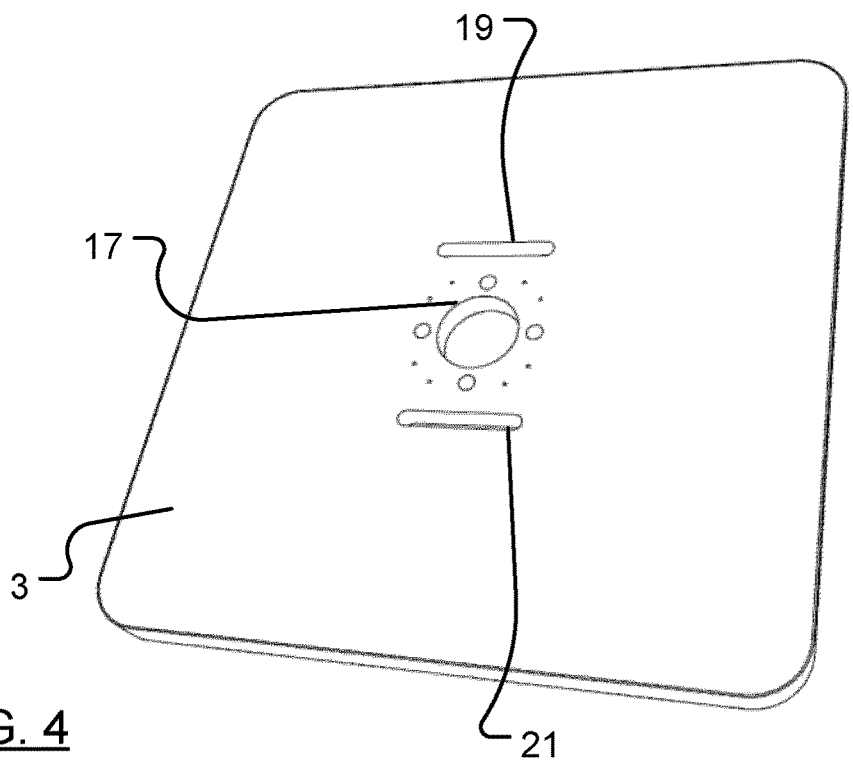
FIG. 4 is a perspective view of an upper side of the base depicted in FIG. 3.
Figure 5:
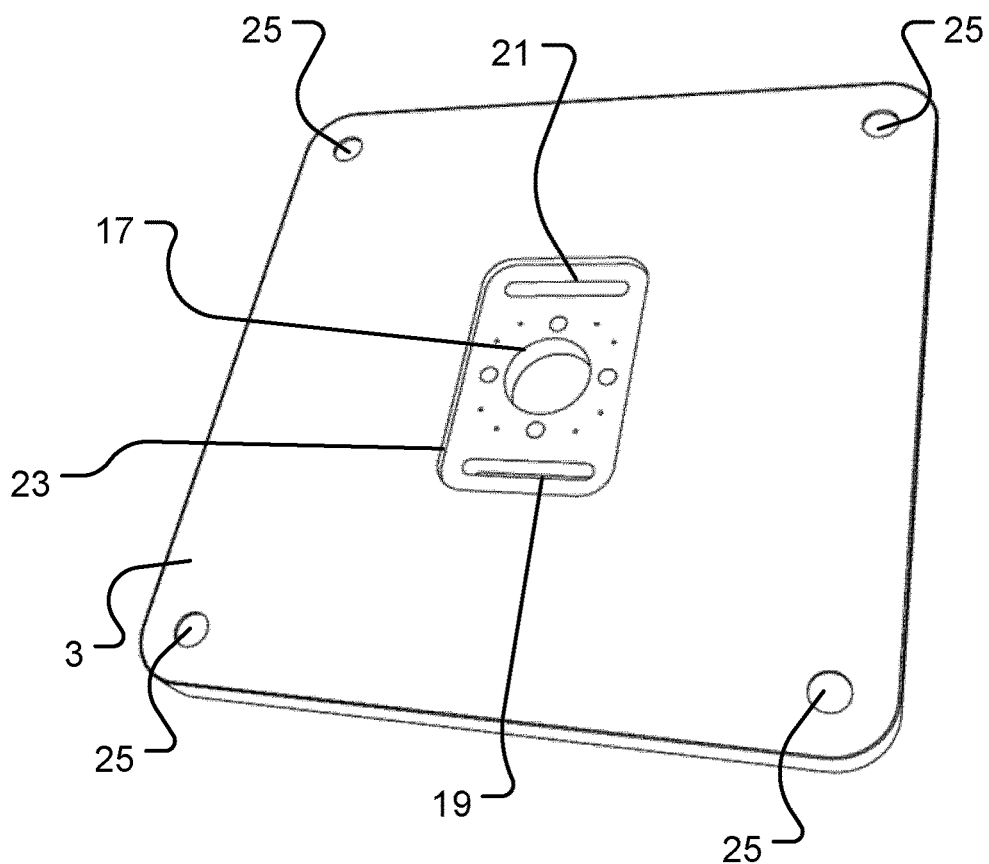
FIG. 5 is a perspective of the underside of the base depicted in FIG. 3.

Referring now to FIGS. 4 and 5, there are depicted—respectively— perspective views of an upper side and a lower side of the base 3. The base includes an aperture 17 so that a user can access the internal mechanism of the support 11 (for example to expand or contract the support) without having to decouple the support from the base. The base also includes first and second slots 19, 21 along which fixings (not shown) coupling the support to the base can slide as the support is expanded or contracted.

The underside of the base includes a recess 23 so that the aforementioned fixings are lifted off a surface, for example a floor, on which the scratching apparatus is placed in use and hence are less likely to scratch that surface if the apparatus should move in use. The underside of the base 3, as shown in FIG. 3, includes a plurality of feet 25 that space the underside of the base from a surface on which it is placed. The feet may be of a high-friction material, such as rubber, to lessen the likelihood of the apparatus moving, in use, over the surface of a floor on which it has been placed.

Figure 6:
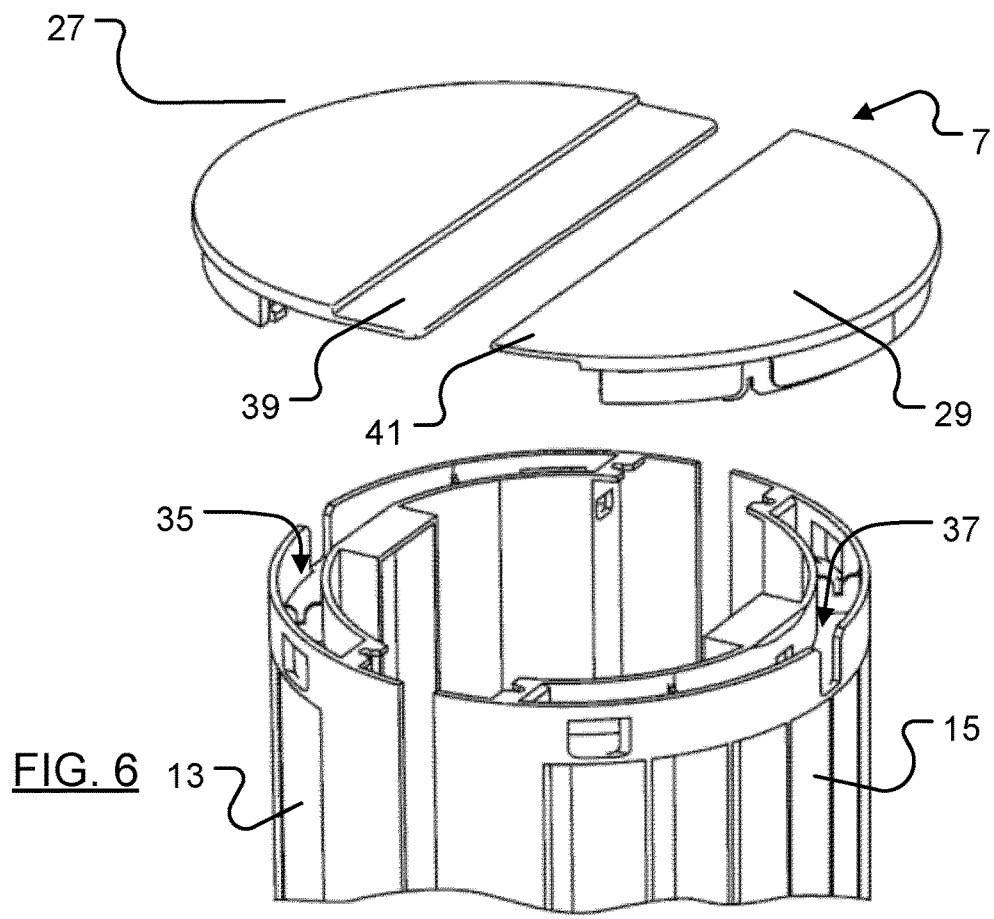
FIG. 6 is a top perspective view of a portion of the apparatus depicted in FIG. 1.
Figure 7:
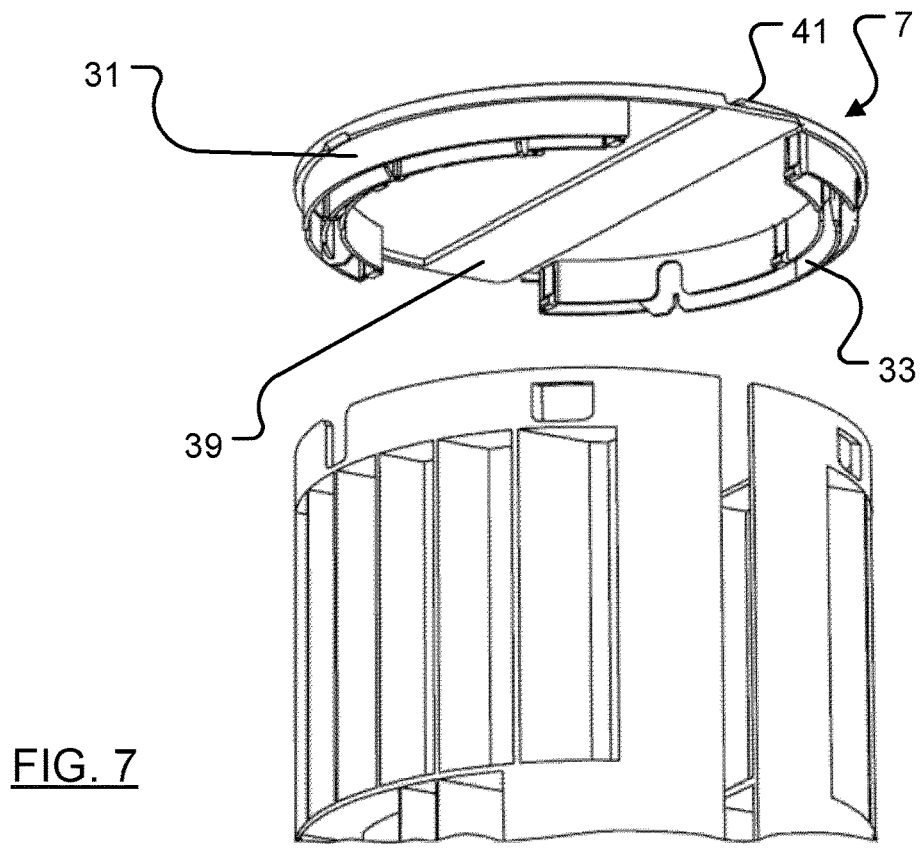
FIG. 7 is an underneath perspective view of the apparatus depicted in FIG. 6.

Referring now to FIGS. 6 and 7, there is depicted an upper portion of the support 11 and the two-part cap 7 that fits into the support (as shown in FIG. 1).

The cap 7 comprises first and second generally semi-circular cap portions 27, 29 from each of which arcuate walls 31, 33 extend. The upper peripheral ends of the support members 13, 15 each include a channel 35, 37 that is configured to accommodate respective arcuate walls 31, 33 of the cap portions 27, 29. The walls 31, 33 may simply sit within the channels 35, 37 or may be configured to positively engage, for example snap-fit, into the channels. Adjacent peripheral edges of the cap portions 27, 29 include respective transversely extending ledges 39, 41 that overlap when the two cap portions 27, 29 are brought together as shown in FIG. 7. The cap is configured so that when the support members 13 are closest together the ledge 41 extending from the second cap portion 29 fully overlaps with the ledge 39 extending from the first cap portion 27 (as shown in FIG. 7). As the support is expanded to tension a cover fitted thereto, the support members move apart and the degree of overlap that occurs when the caps are fitted to respective support members lessens. In the preferred arrangement the degree of support expansion permitted is such that the interior of the support is always covered when the cap 7 is fitted thereto.

Figure 8:
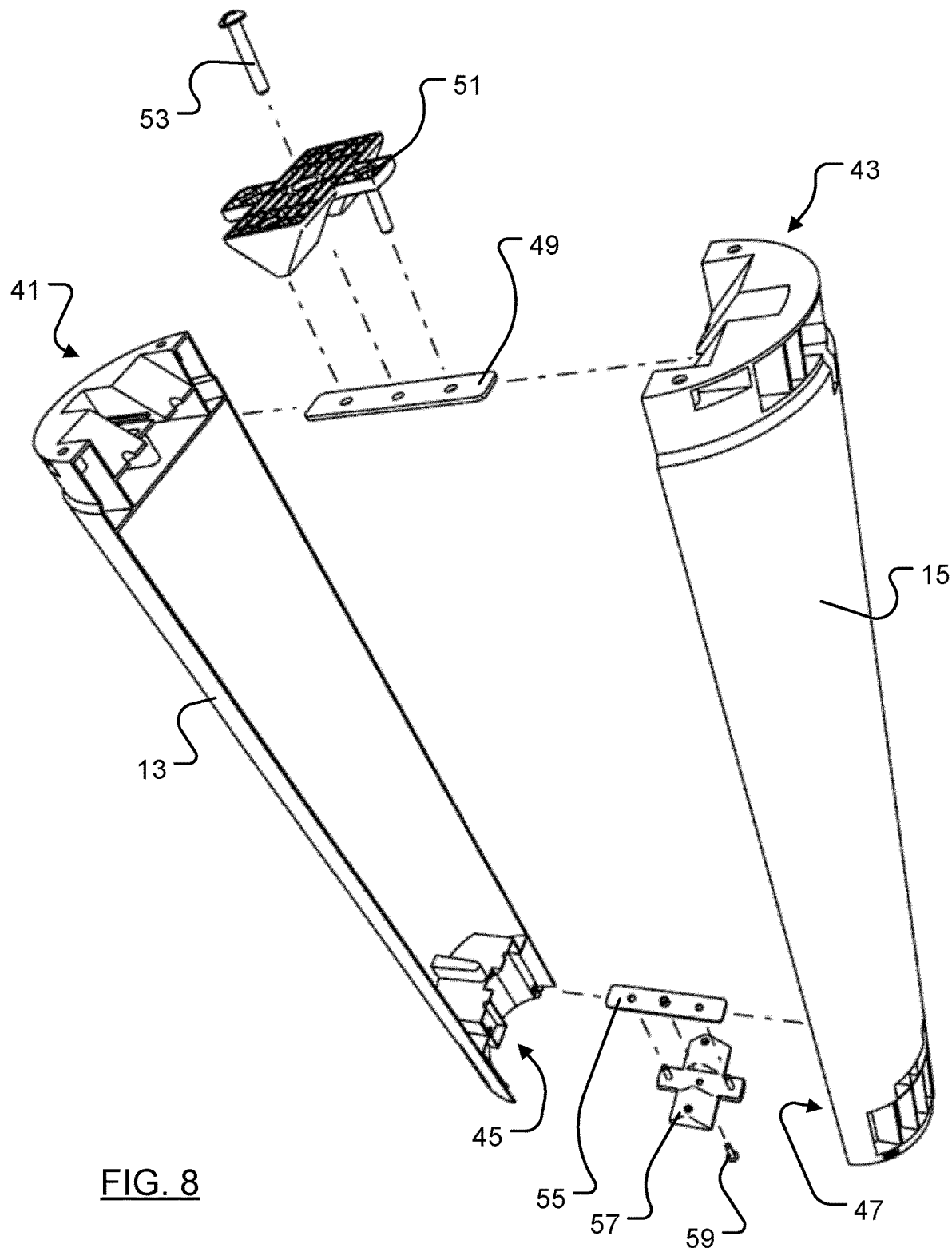
FIG. 8 is an exploded perspective view of an expandable support for the apparatus of FIG. 1.

FIG. 8, as aforementioned, is an exploded perspective view of the expandable support. However, in FIG. 8 the support is shown inverted with the "lower" end (i.e. the end that will be adjacent the base when the apparatus is fully assembled) uppermost in the figure, and the "upper" end (i.e. the end to which the cap is fitted when the apparatus is fully assembled) lowermost in the figure.

The support members are coupled together and movable relative to one another to expand or contract the support in the same way using similar structural components in the vicinity of upper and lower ends of the support. Although the coupling formations provided in the vicinity of respective ends of the support differ slightly in form, this does not affect the manner in which they operate and to that end only the coupling formations in the vicinity of the lower end of the support will hereafter be described in detail.

With the foregoing in mind, reference will now be made to FIGS. 8, 9a and 9b, which depict the expandable support and the aforementioned first and second support members 13, 15. The support members 13, 15 each include a lower coupling formation 41, 43 in the vicinity of each lower end, and an upper coupling formation 45, 47 in the vicinity of each upper end ("upper" referring to the end that will be uppermost in use and to which the cap can be fitted, and "lower" referring to the end that will be lowermost in use adjacent the base (when the apparatus is fully assembled)).

Between respective coupling formations each support member is generally semi-circular in transverse cross-section. As aforementioned, the upper coupling formations are functionally identical, albeit slightly structurally different— the chief difference being that the lower coupling formations are at or at least close to the lower ends of the support members (to facilitate coupling to the base) whereas the upper coupling formations are spaced from the upper ends of the support members so as to provide room for coupling the cap to the support.

The lower coupling formations 41, 43 are coupled together by means of a generally rectangular retainer 49, a co-operating lower wedge 51 and a fixing 53. Similarly, the upper coupling formations 45, 47 are coupled together by means of a generally rectangular retainer 55, a co-operating upper wedge 57 and a fixing 59. As aforementioned, the upper and lower coupling formations function in the same manner, and are structurally similar to one another.

Figure 9A:
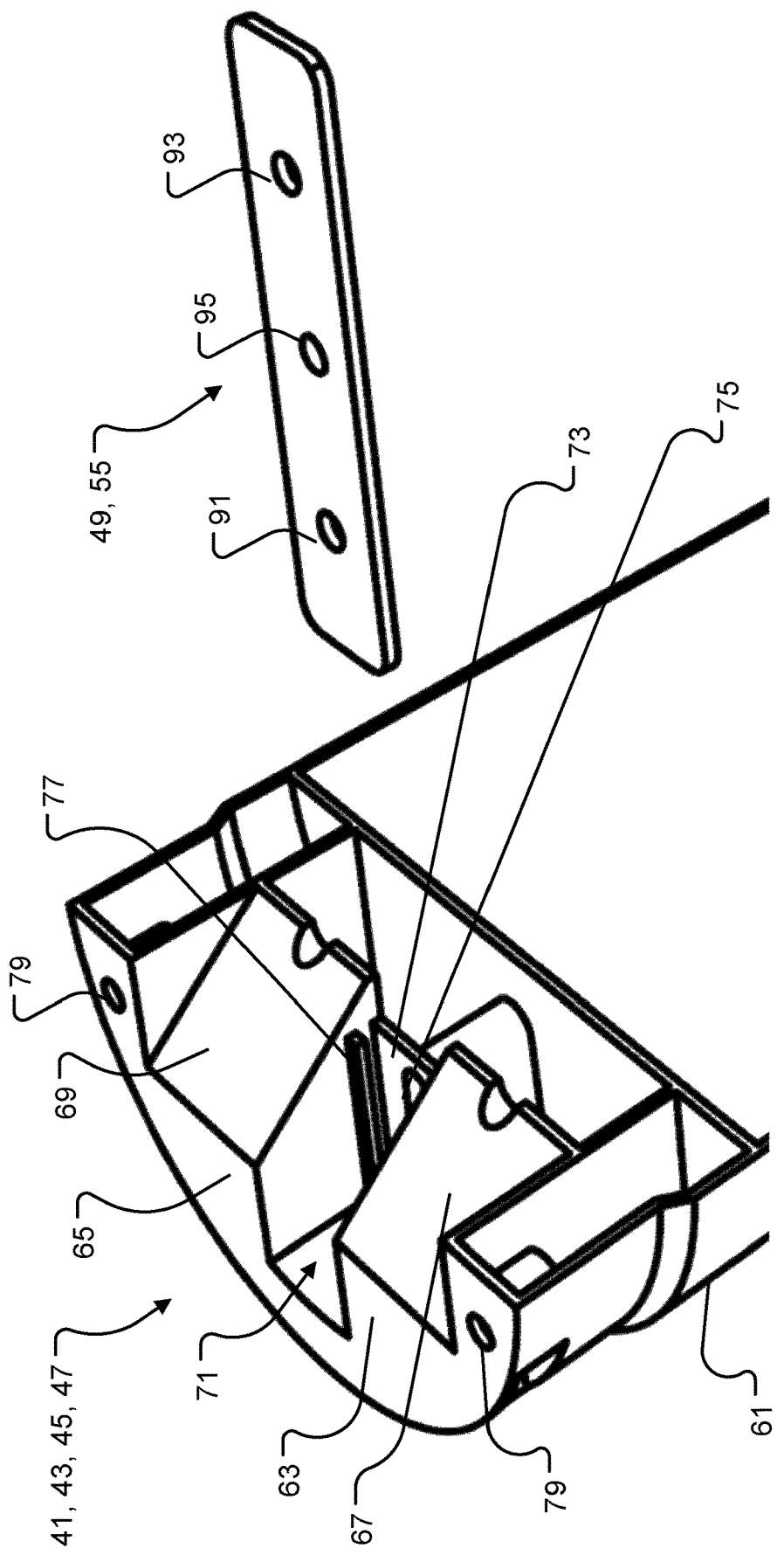
FIG. 9a is an enlarged view of a portion of the support shown in FIG. 8.

As shown in FIG. 9a (where one lower coupling formation is shown, the other lower coupling formation being an identical mirror image), the upper and lower coupling formations each include first and second projections 63, 65 that project inwardly in a direction away from an external peripheral surface 61 of the support member. Each projection 63, 65 terminates in a ramped surface 67, 69 that is inclined away from the base (in the context of the lower coupling formations) or away from the cap (in the context of the upper coupling formations). A channel 71 is provided between the projections, and the channel terminates in a lateral wall 73 that is provided with a slot 75. A pair of ribs 77 (one of which is visible in FIG. 9a) extend from the projections 63, 65 into the channel 71 and are spaced from the lateral wall 73 to leave a space between the ribs and the lateral wall 73, which space is sized to slidably accommodate one end of the rectangular retainer 49, 55.

The lower coupling formation depicted in FIG. 9a, in a difference from the upper coupling formations, also includes a pair of keeps 79 that co-operate with fixings (not shown in this figure) to enable the support to be secured to the base. In the preferred arrangement the keeps 79 comprise internally threaded cylinders that co-operate with bolts or screws to couple the support to the base in a manner that is later described below.

Figure 9B:
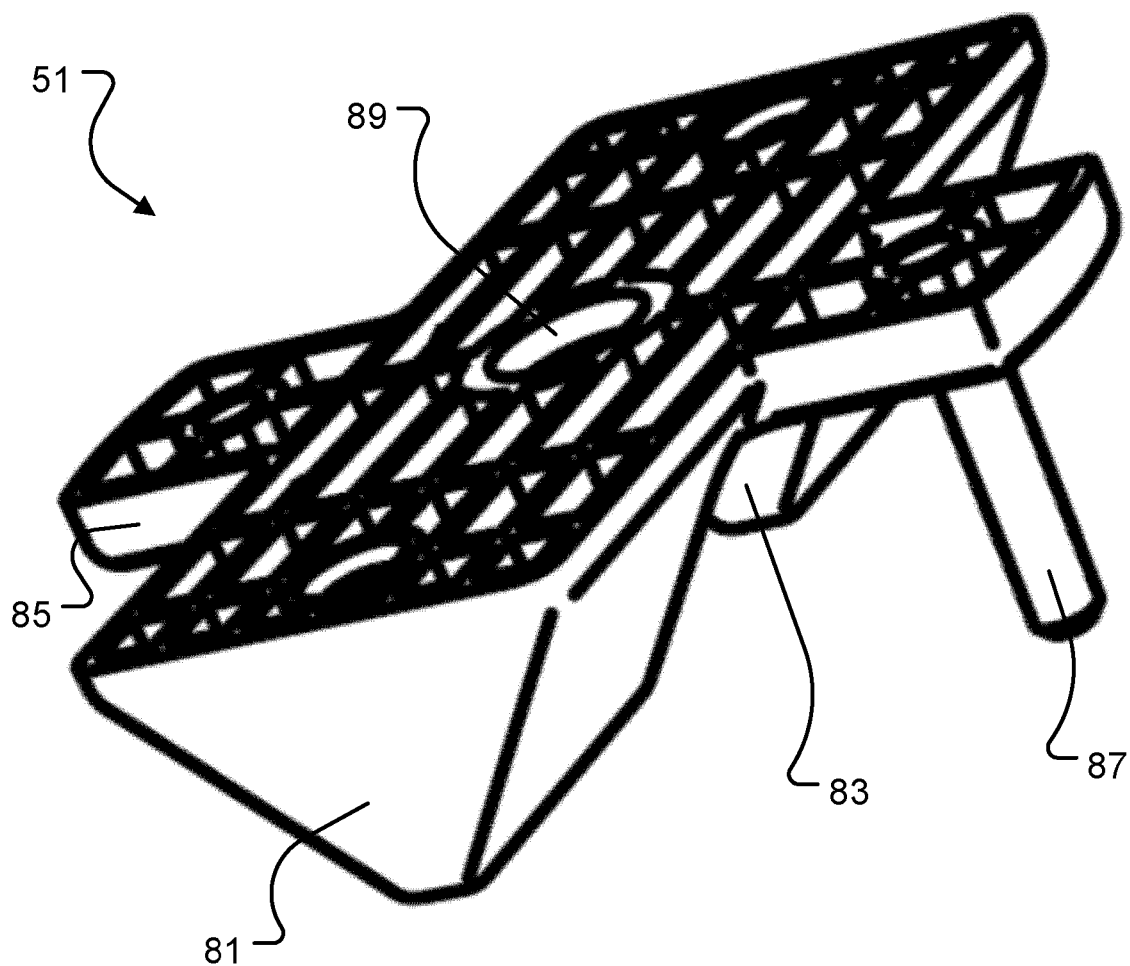
FIG. 9b is an enlarged view of another portion of the support shown in FIG. 8.

FIG. 9b is a schematic perspective view of a co-operating wedge 51, 57. As aforementioned the wedges in the vicinity of either end of the support are identical and hence only one shall now be described, in this case the lower co-operating wedge 51.

The cooperating wedge 51 comprises first and second wedge shaped portions 81, 83 that are coupled to one another by a generally rectangular plate 85 that extends transversely to either inclined side of the wedge shaped portions 81, 83. The wedge shaped portions are, as shown, generally triangular in lateral cross-section, and preferably include inclined faces that have an angle of inclination which is the same as, or at least similar to, the angle of inclination of the aforementioned ramped surfaces 67, 69. A pair of retaining pins 87 (only one of which is visible in FIG. 9b, but both of which are shown extending from the upper wedge 57 in FIG. 8) extend from points in the vicinity of respective ends of the rectangular plate 85, and an aperture 89 for receiving the fixing 53 is provided therebetween.

Figure 10:
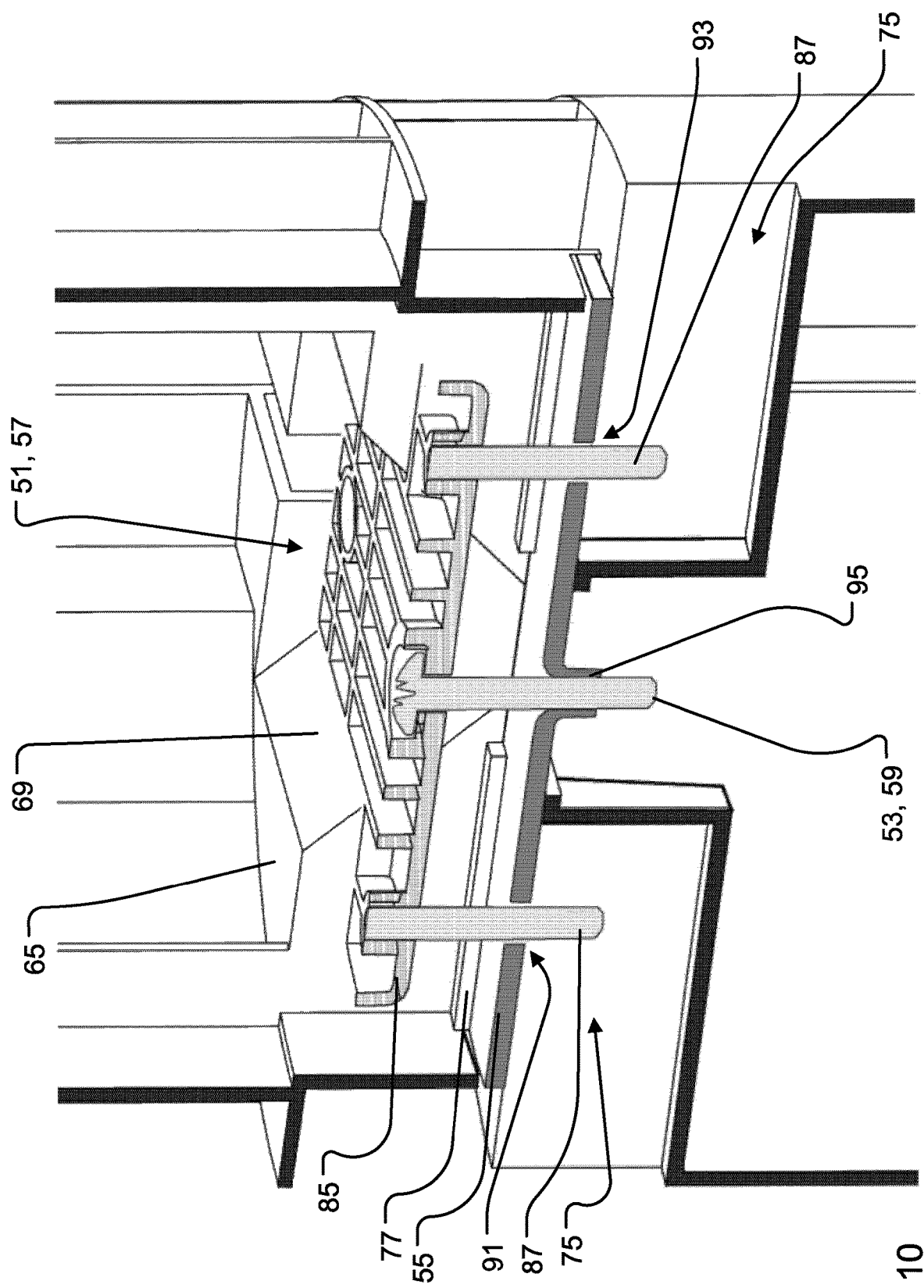
FIG. 10 is a sectional view along the line A—A of FIG. 3.

The rectangular retainers 49, 55, as best shown in FIG. 9a, include an aperture 91, 93 provided in the vicinity of respective ends of the retainers, and a threaded bore 95 through the rectangular retainers 49, 55 is provided between the apertures 91, 93. As can best be seen in FIG. 10 (which is a cross-sectional view along the line A—A of FIG. 3 through the upper end of the support), when the retainers 49, 55 and wedges 51, 57 are brought together, the retaining pins 87 of the wedge 51 are arranged so as to align with and extend through the apertures 91, 93 in the rectangular retainer 49, 55; and the threaded bore 95 in the rectangular retainer 49, 55 is arranged to align with the aperture 89 in the rectangular plate 85. As shown in FIG. 10, the pins extend through the retainer and into the slots 75 provided in the lateral walls 73 in the channel 71 between the projections 63, 65. The fixing 53, in this instance a threaded bolt, extends through the aperture 89 in the rectangular plate and engages with the threaded bore 95.

Advantageously, if the fixings 53, 59 should be inadvertently (or intentionally) decoupled from the associated retainers 49, 55 the facts that the pins 87 are received in the associated slots 75 stops the two support members from falling apart.

Figure 11:
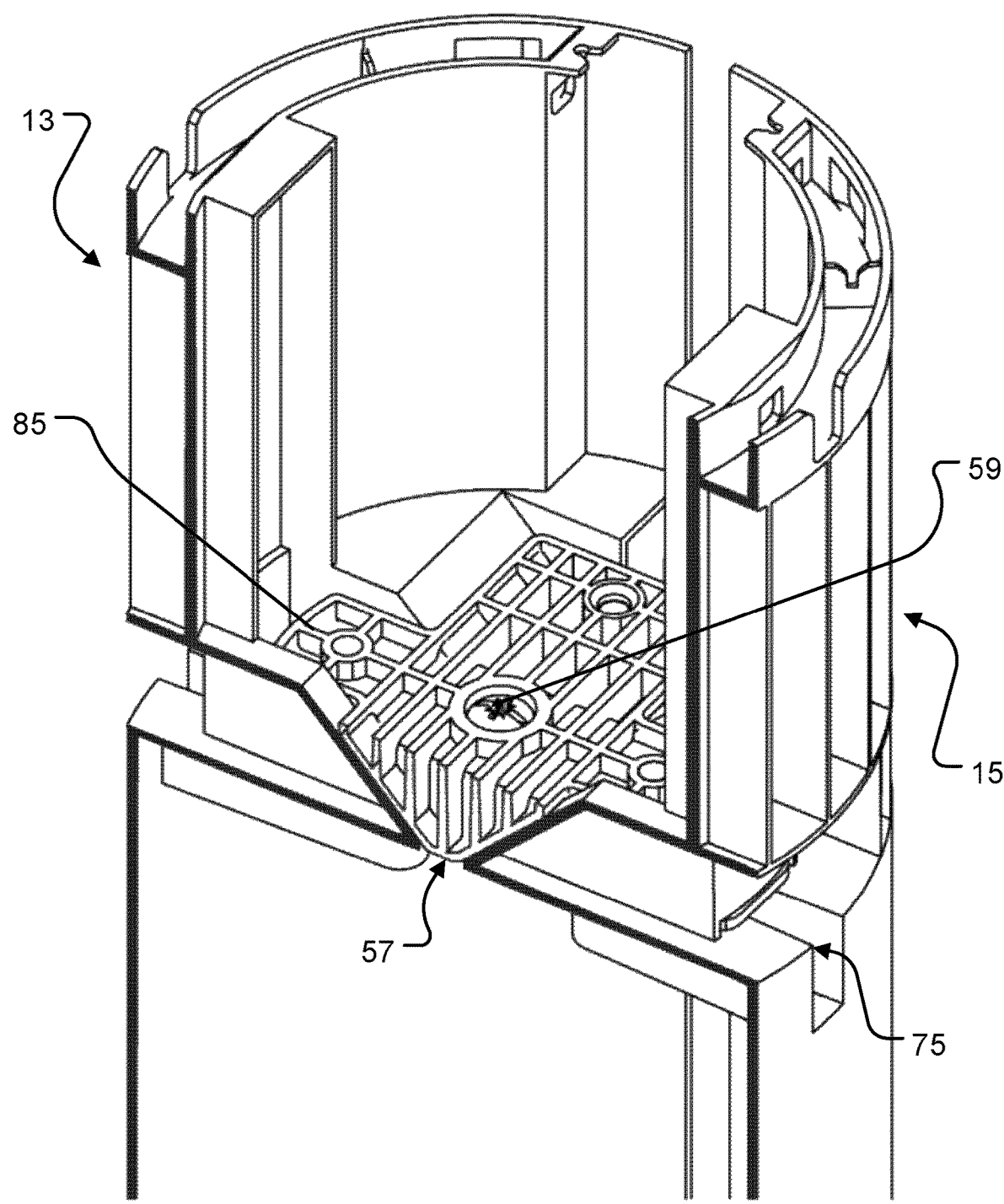
FIG. 11 is a sectional view along the line B—B of FIG. 3.
Figure 12:
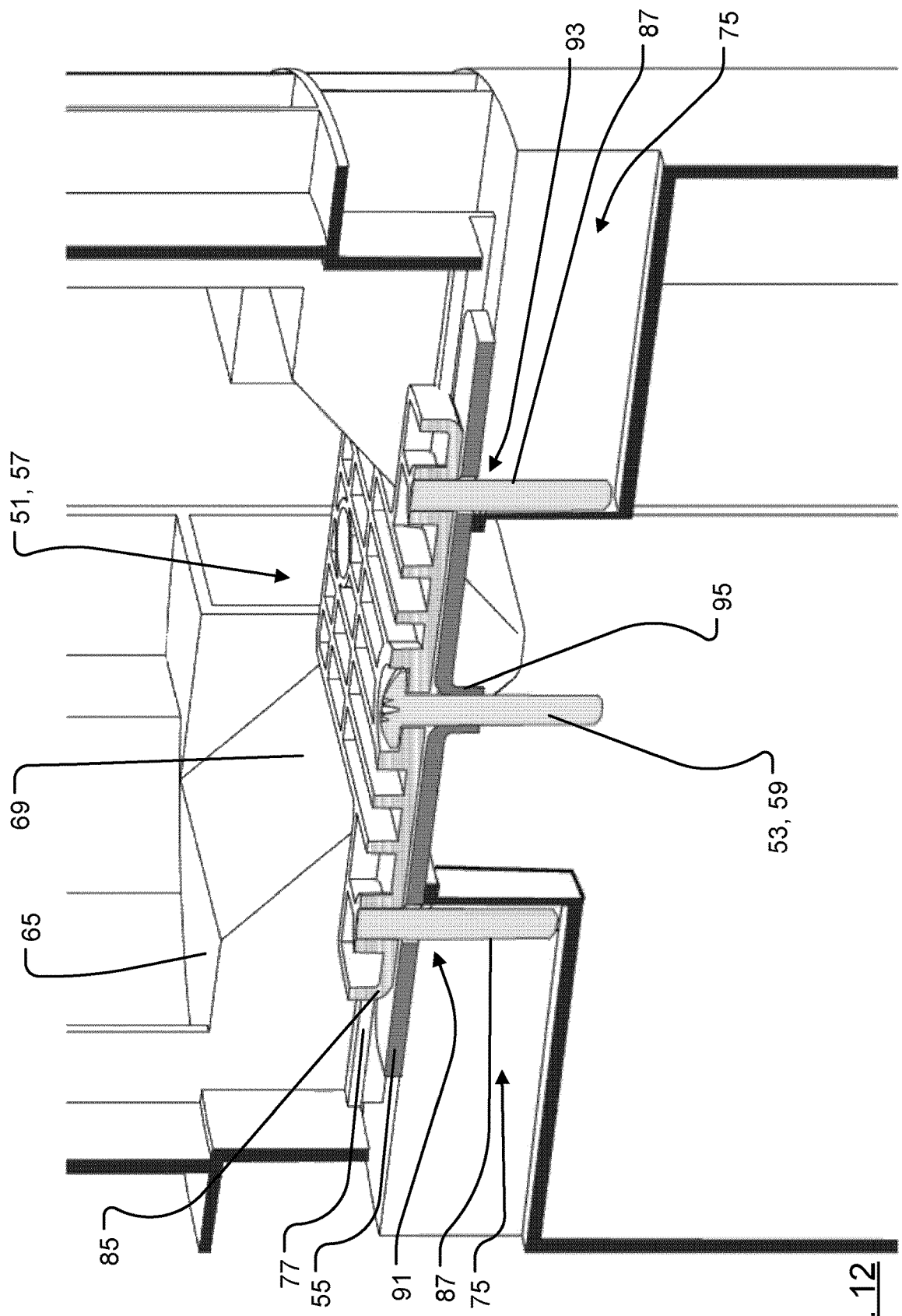
FIGS. 12 and 13 are cross-sectional views along the lines A—A and B—B, respectively, of FIG. 3 showing the support in another configuration.
Figure 13:
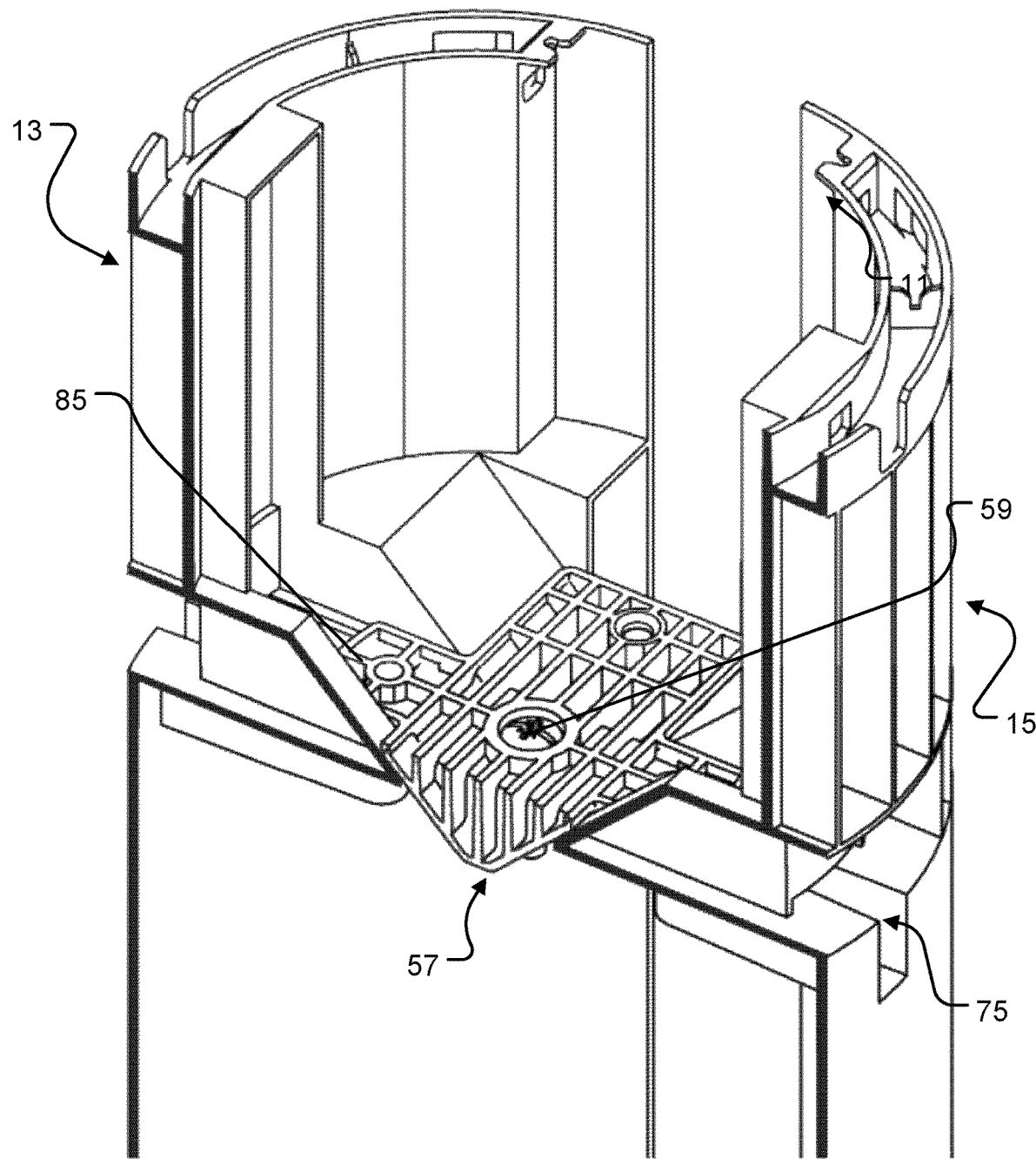

The manner in which the coupling formations operate will now be described with reference to FIGS. 10 to 13 of the accompanying drawings, which figures are cross-sections through the "upper" end of the support (it being remembered, of course, that the lower end of the support is structurally similar and functionally identical). FIG. 10 is a schematic cross-sectional view along the line A—A of FIG. 3, and FIG. 11 is a schematic cross-sectional view along the line B—B of FIG. 3. FIGS. 12 and 13, respectively, show the same cross-sectional views as FIGS. 10 and 11 except that the coupling formations have been operated to drive the two parts of the support apart.

As will be apparent to persons of skill in the art by comparing FIGS. 10 and 11 with FIGS. 12 and 13, as the fixing 59 is screwed into the threaded bore 95 the rectangular plate 85 of the wedge 51 is drawn towards the rectangular retainer 55 (which is retained (relative to the support members) at either end by the ribs 77) and, concomitantly therewith, the wedge shaped portions 81, 83 are drawn across the ramped surfaces 67, 69 of each projection 63, 65 to thereby drive the top portion of the support members 13, 15 from the configuration shown in FIGS. 10 and 11 where the respective support members are relatively close to one another towards the configuration shown in FIGS. 12 and 13 where the support members are spaced from one another. Screwing the fixing 53 of the lower coupling formation into the associated retainer 49 drives the lower portions of the support members apart in a similar manner.

It will be appreciated that by turning the upper and lower fixings 59, 53 a user can cause the support members to apart from one another, and hence move the support as a whole between a configuration where a cover 5 of the type shown in FIG. 2 is loosely supported by the support (and hence can be removed and replaced) to a configuration where a cover is tensioned and supported by the support for use as a scratching post.

Turning the upper and lower fixings 59, 53 in the opposite direction increases the spacing between the wedges and associated retainers, and the support members can be moved closer to one another to relax the cover mounted on the support.

Figure 14:
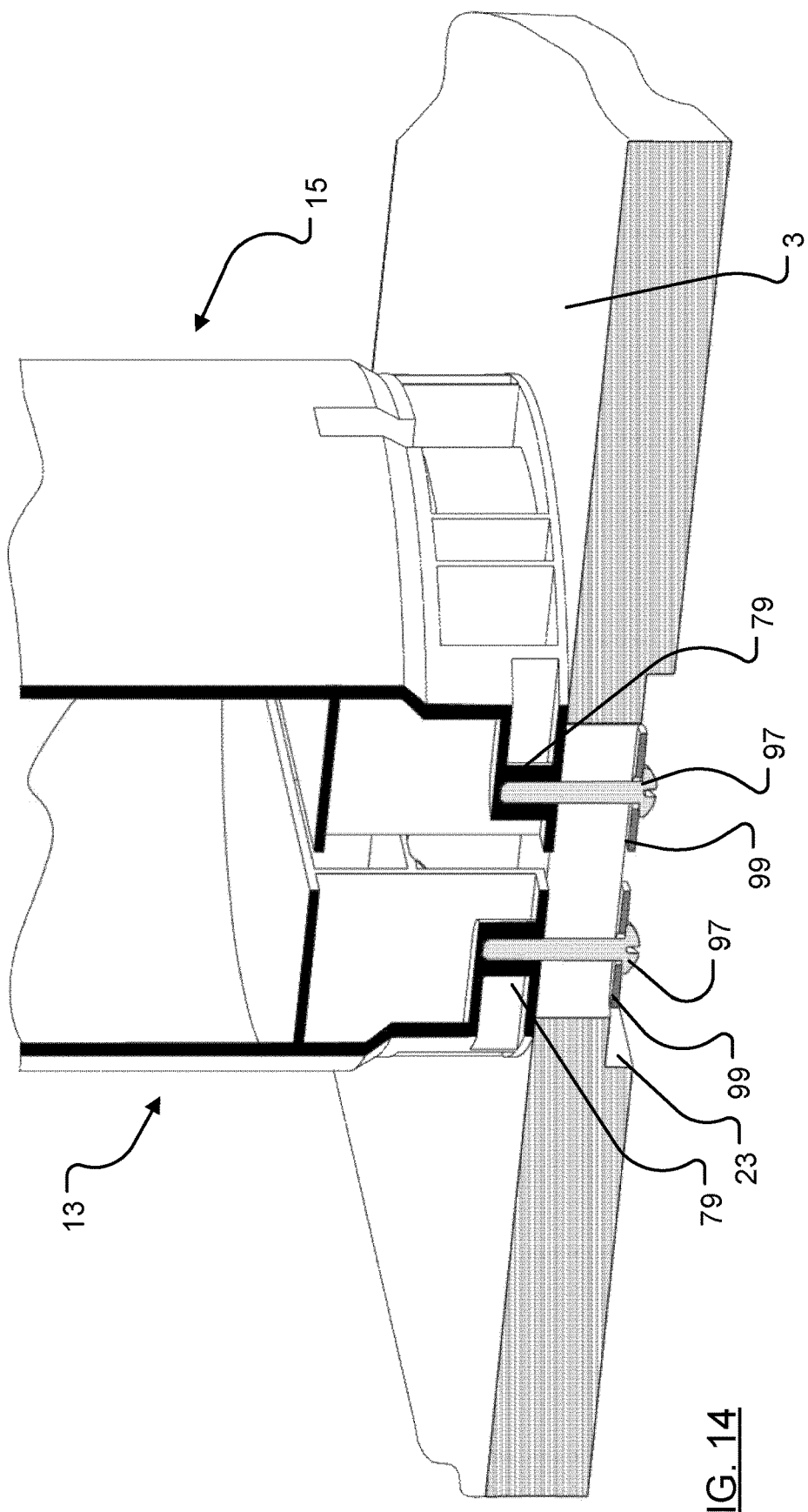
FIGS. 14 and 15 are part sectional views of the base when coupled to the expandable support.
Figure 15:
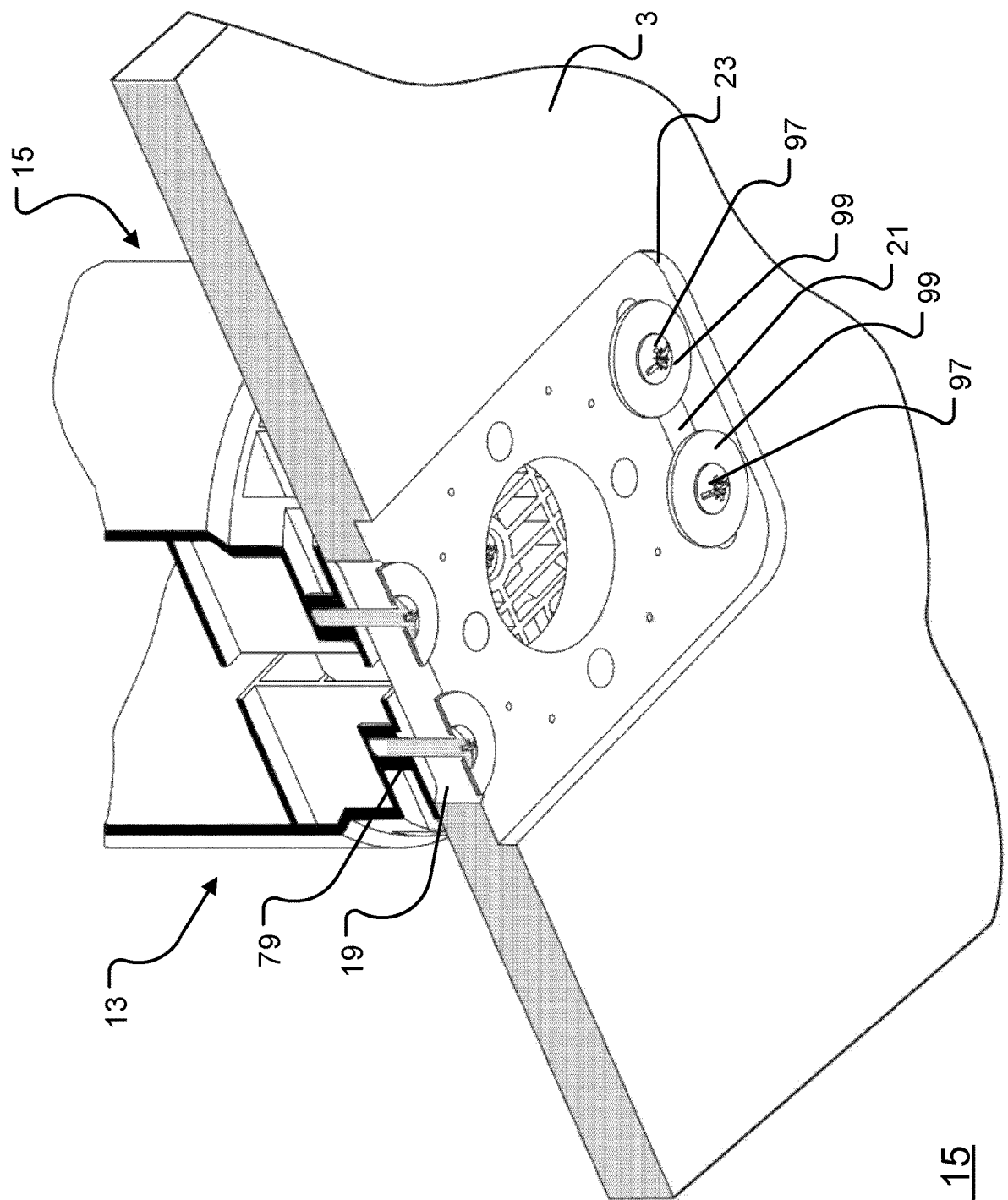

FIGS. 14 and 15 are part cross-sectional views along the line C-C of FIG. 3 depicting the manner in which the lower end of the support is coupled to the base 3 so that, in this embodiment, both support members can move relative thereto when the lower fixing 53 is screwed into the lower rectangular retainer 49 (it being remembered that it is only preferred for both support members to move relative to the base, and that it is envisaged for only one support member to move relative to the base).

As aforementioned, each support member includes a pair of keeps 79, and the support members are configured so that first keeps 79 of each support member (when the members are brought together) align with the first 19 of the two slots in the base and second keeps (not visible) align with the second 21 of the two slots in the base. Fixings 97 extend through washers 99 and each engage with a respective keep to secure the base to respective support members. In the preferred arrangement the fixings 97 and keeps 79 are configured so that the support members are closely coupled to the base, without being so closely coupled to the base that they cannot slide over the surface of the base without being loosened. In another envisaged arrangement, the fixings and keeps are configured so that the support members cannot move relative to one another without the fixings first being loosened.

Advantageously, since the slots open to a recess 23 in the underside of the base, the heads of the fixings 97 are less likely to scrape across the surface of the floor on which the apparatus sits.

As shown in FIG. 15, when the support members are coupled to the base, the aperture 17 in the base aligns with the fixing 53 that couples the lower wedge 51 to the co-operating generally rectangular retainer 49. By virtue of this arrangement a user can adjust the spacing of the respective support members (by screwing the fixing 53 into or out of the lower rectangular retainer 49) without having to decouple the support members from the base.

Figures 16A, 16B:
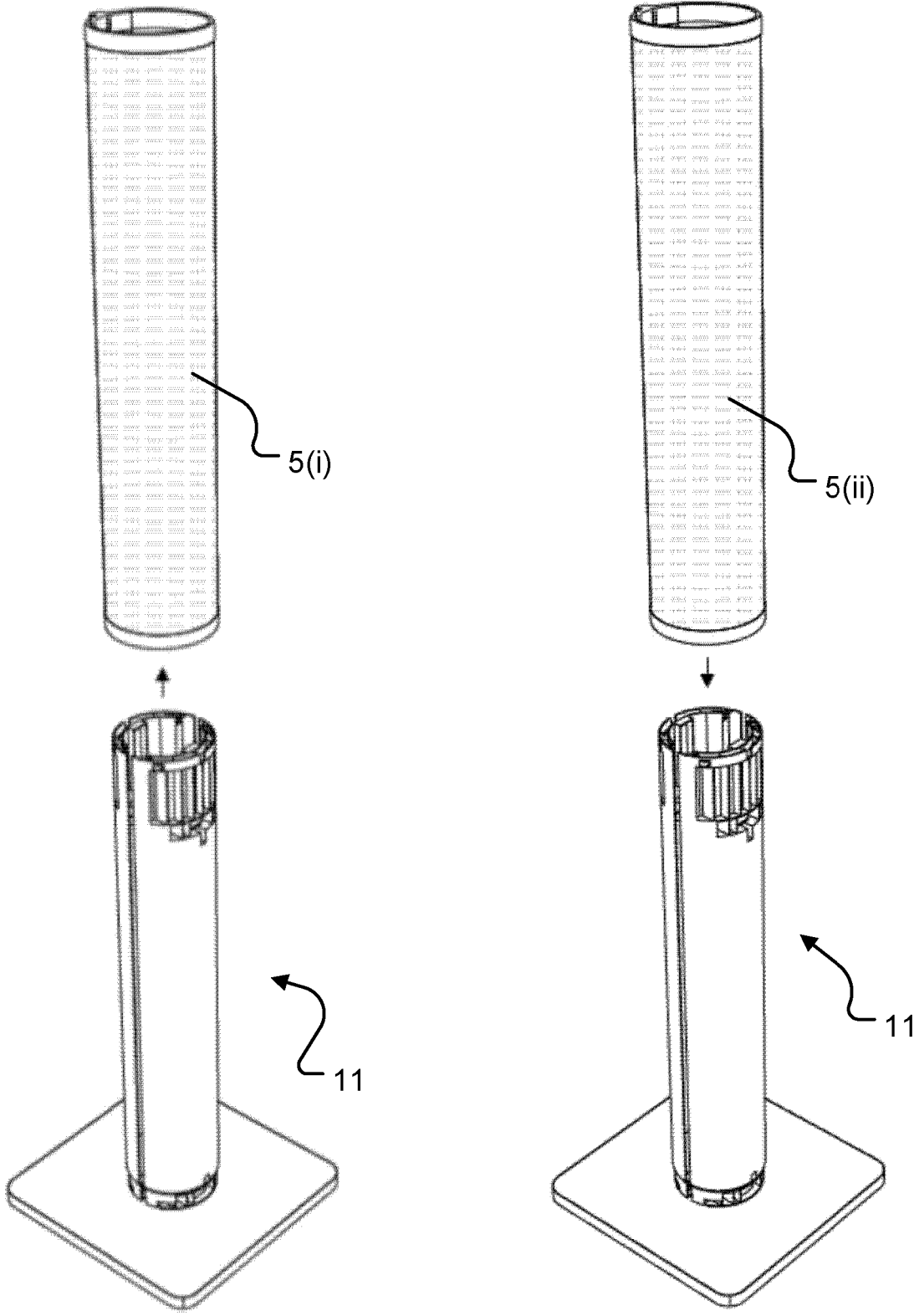
FIGS. 16a and 16b are schematic depictions of the manner in which a cover of the type shown in FIG. 2 can be removed from a support of the type shown in FIG. 3 and then replaced.
Figure 17:
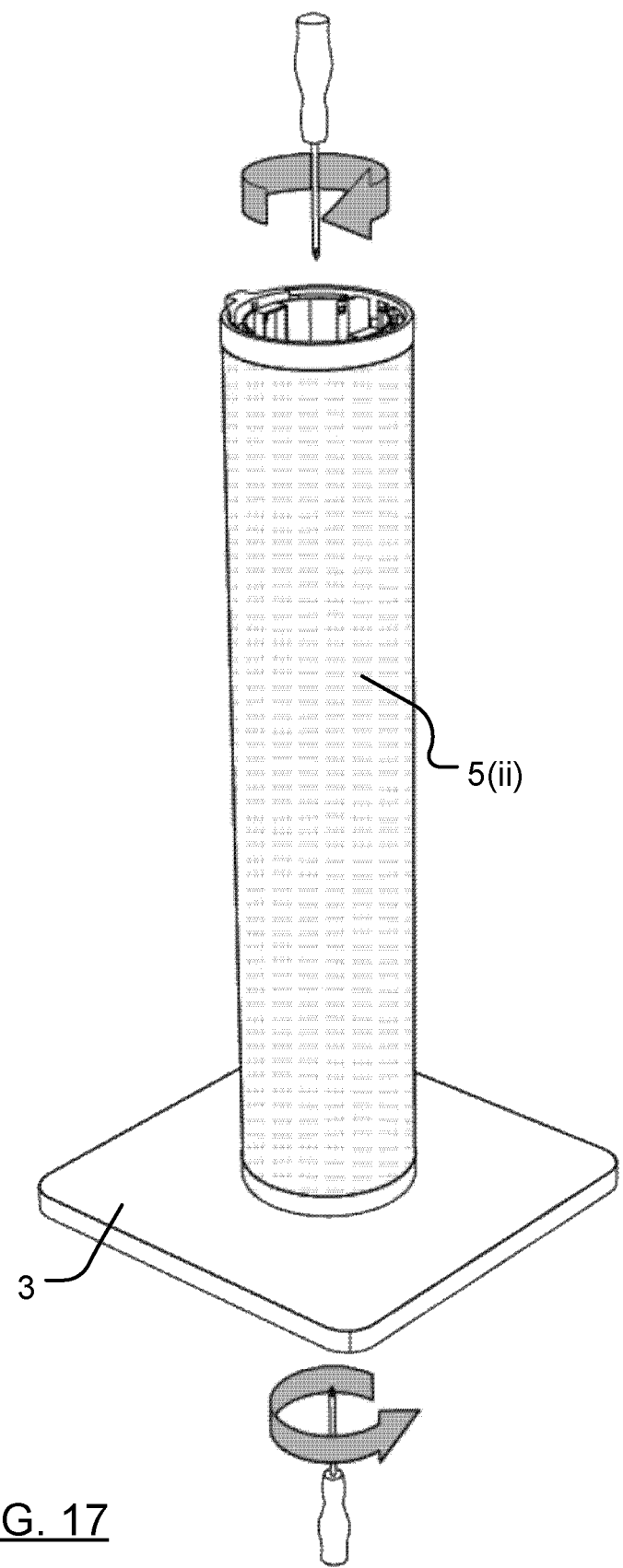
FIG. 17 illustrates how the apparatus depicted in FIG. 16 can be adjusted to expand the support and thereby tension the cover.

Referring now to FIGS. 16*a*, 16*b* and 17, with the support in the position depicted in FIGS. 3 and 10 (i.e. with the upper and lower wedges withdrawn from the associated upper and lower rectangular retainers), a worn cover 5(*i*) is only loosely supported by the support 11 and can simply be lifted off the support (as shown in FIG. 16*a*) once the cap 7 has been removed. A new replacement cover 5(*ii*) can then be slid onto the support 11 (as depicted in FIG. 16*b*) so that the replacement cover 5(*ii*) is now loosely supported by the support 11.

Once the replacement cover 5(*ii*) has been placed onto the support, a user tightens the fixings 53, 59 (using a screwdriver for example) of the upper and lower coupling formations so that the wedges 51, 57 are drawn towards the associated retainers 49, 55 and the support members 13, 15 are driven outwardly into abutment with an interior surface of the replacement cover 5(*ii*). As the support member are so driven, the replacement cover 5(*ii*) is tensioned around the support 11 to form an effective scratching apparatus. Once the replacement cover 5(*ii*) has been tensioned to an appropriate extent, the cap 7 can be refitted to the support, and if necessary the fixings 97 can be tightened, whereupon the apparatus will be ready to be used.

Figure 18:
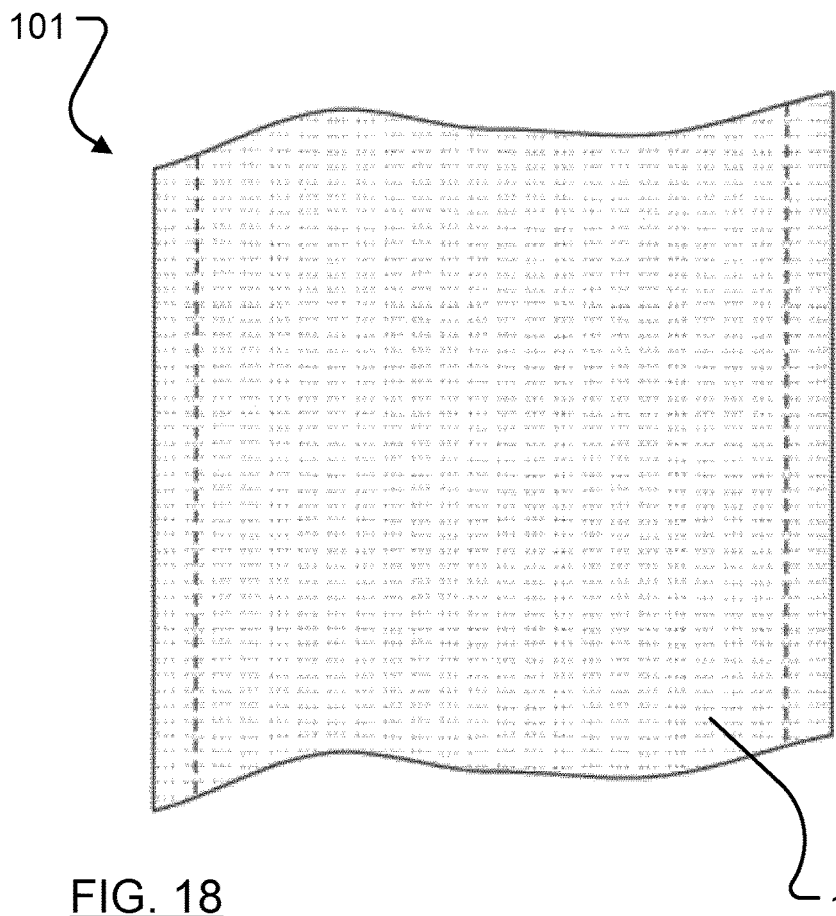
FIGS. 18 and 19 are front and rear perspective views of a cover for a second embodiment of scratching apparatus.
Figure 19:
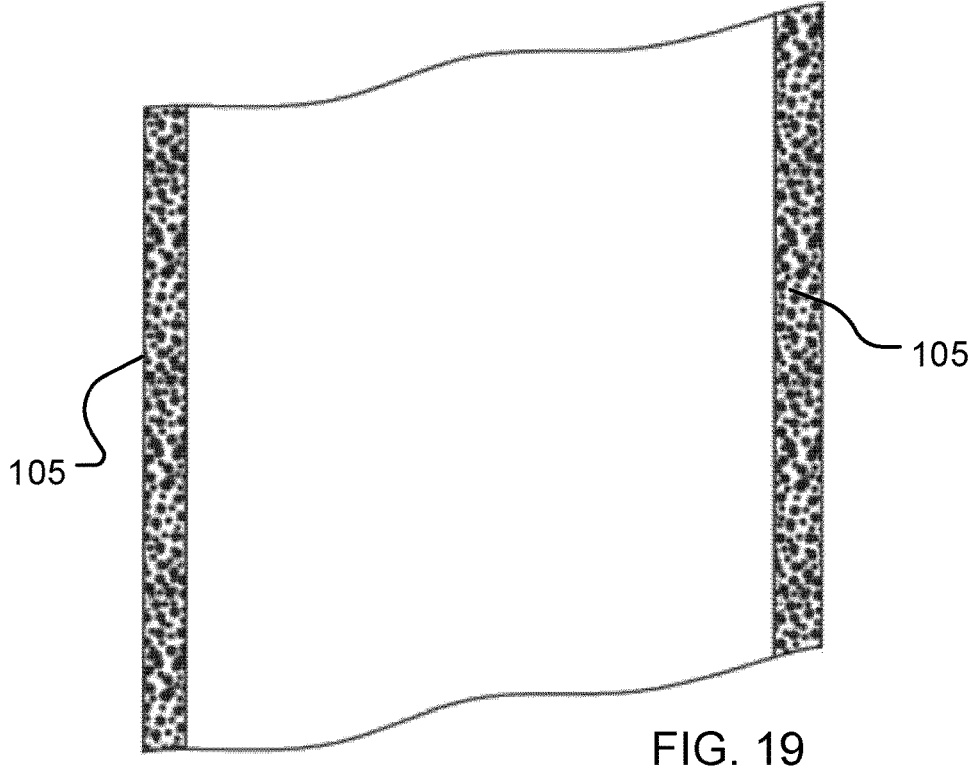

Referring now to FIGS. 18 and 19 of the drawings, there is depicted—respectively —front and rear perspective views of a cover 101 for a second embodiment of scratching apparatus. The cover 101 comprises a generally planar panel of material (typically a generally rectangular panel of material) with a scratchable surface 103 that will form the outer surface of the cover in use. The cover may comprise a panel of woven sisal, carpet or any other suitable material against which an animal, such as a feline, can scratch its' claws. The opposing side of the cover 101 includes—in the vicinity of opposing shorter sides of the cover 101—a plurality of instances of one part of a two-part mechanical fastener. For example, the opposing side of the cover 101 may include two strips of mechanical hook and loop fastener 105 (such as Velcro®, for example) affixed—for example, stitched—to the cover 101 at least in the vicinity of opposing shorter sides of the cover 101. In alternative arrangements, other types of two-part fastener, such as press studs, could be employed if desired.

Figure 20:
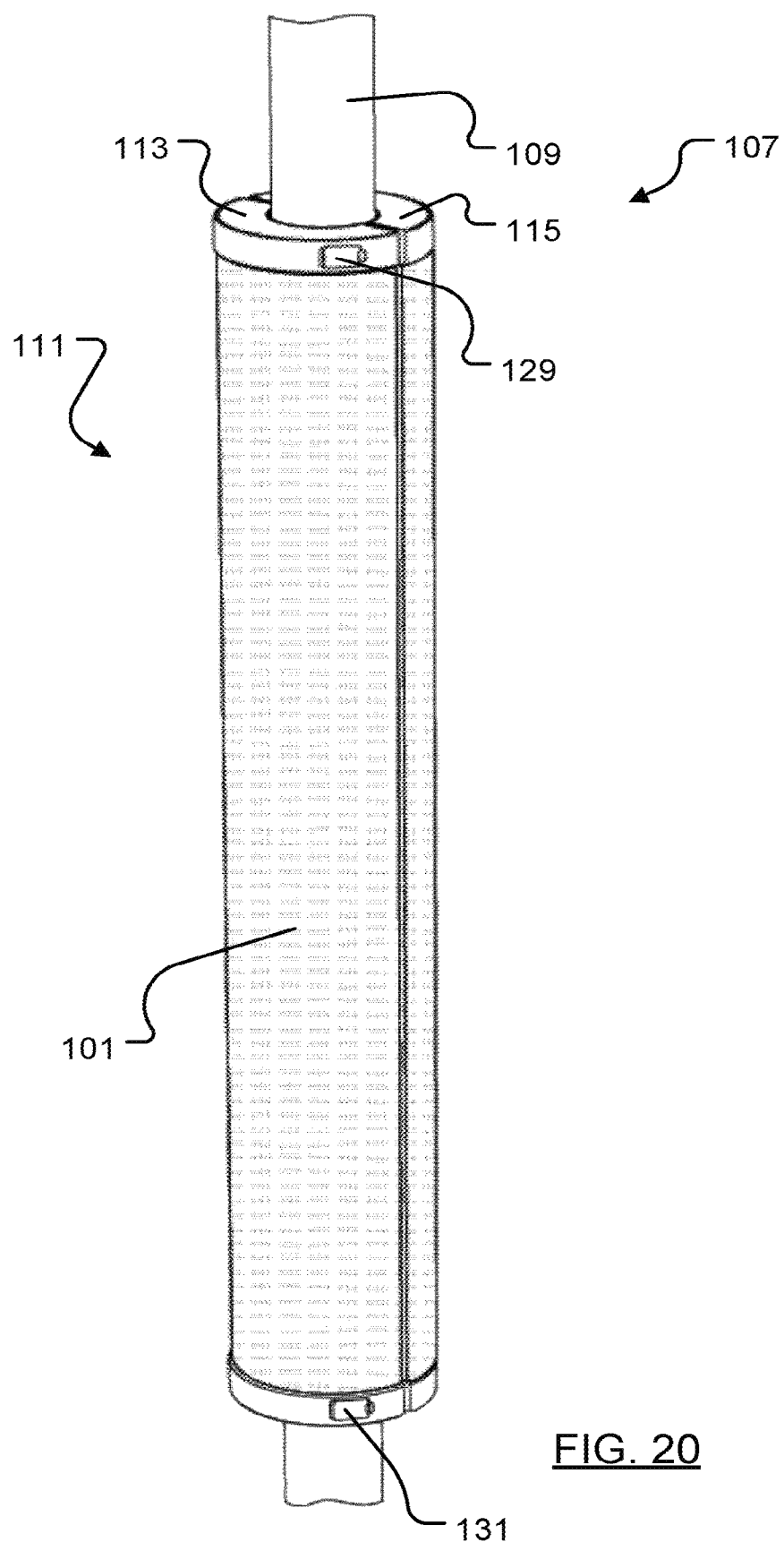
FIG. 20 is a perspective view of an assembled scratching apparatus according to the aforementioned second embodiment.
Figure 21:
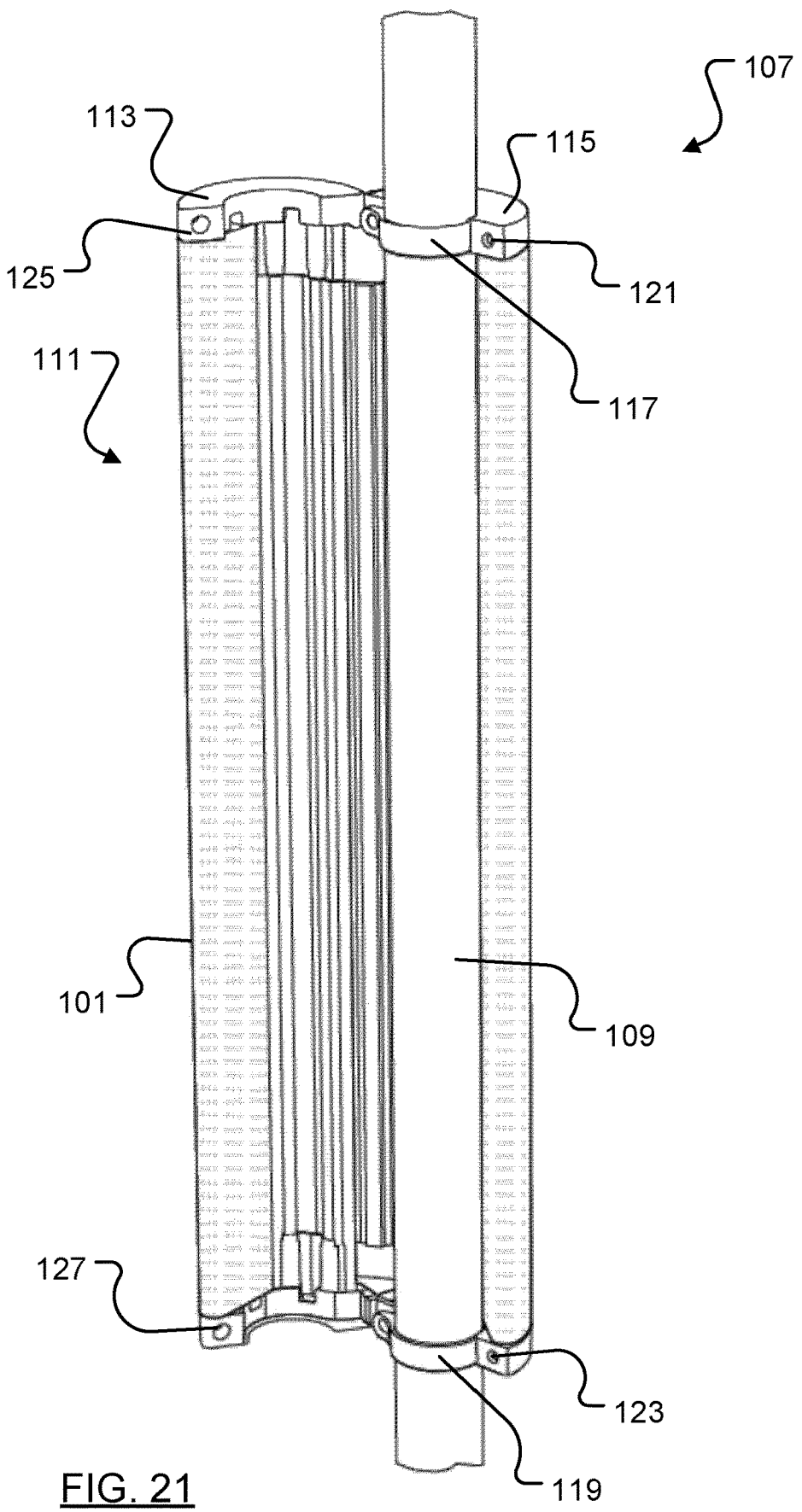
FIG. 21 is a perspective view of the apparatus depicted in FIG. 20 shown partly disassembled.

FIG. 20 is a perspective view of an assembled scratching apparatus 107 according to the aforementioned second embodiment, and FIG. 21 is a perspective view of the apparatus 107 depicted in FIG. 20 shown partly disassembled.

The scratching apparatus depicted in these figures is shown as being assembled around a pole 109, for example a pole that forms part of a so-called "cat tree" or a chair or table leg. It will be appreciated, however that the pole could be coupled at one end to a base to form scratching apparatus intended to sit on the floor (in a similar manner to the first embodiment).

The apparatus comprises a support 111 to which the aforementioned cover 101 has been fitted. The support 111 is a two-part support comprising first and second support members 113, 115 coupled to one another in a "clamshell" configuration. As will be appreciated, a "clamshell" configuration is one where two components are hingedly coupled to one another along an edge, in a manner similar to a laptop computer for example. The hinge (not visible in the figures), in this arrangement, may comprise a mechanical hinge or a living hinge.

The first and second support members 113, 115 are generally "C" shaped in lateral cross-section, so that the support members—when closed together—define a tubular body in which—in this particular example—the pole 109 can be accommodated. One support member, in this instance the second support member, includes a pair of lateral arms 117, 119 located, respectively, in the vicinity of the top and bottom of the support. The arms are configured to be secured around the pole 109 to securely couple the second support member 115 to the pole 109.

Respective interior portions of the first and second support members distal from the hinge between them are provided with a plurality of instances of the second part of the aforementioned two-part mechanical fastener. For example, the cover may be provided with a strip of loops in the vicinity of either shorter edge, and interior portions of the first and second support members may each be provided with a strip of hooks. In this way, a strip of loops (for example) on the cover at one shorter side may be coupled to a strip of hooks (for example) on the inside of the first support member and the strip of loops (for example) on the cover at the opposite shorter side may be coupled to a strip of hooks (for example) on the inside of the second support member so that the cover 101 extends around the outside of the support to cover the hinge with the scratchable surface outermost.

The second support member 115 includes first and second keeps 121, 123 in the vicinity of the upper and lower ends of the support. The keeps 121, 123 align with channels 125, 127 in the first support member 113 when the clamshell support is closed, and fixings (not shown) can be inserted from outside of the support through the channels and engaged with the keeps to securely couple one support member to the other once the cover has been fitted to the support. In FIG. 20, the first support member includes a pair of removable blanking plates 129, 131 that have been inserted into the channels to obstruct access to the fixings.

An advantage of this particular apparatus is that by choosing the size of the cover and the placing of the associated fasteners on the cover and the support members it is possible to provide scratching apparatus that automatically tensions the cover when the user closes the clamshell without the user having to adjust the apparatus once a used cover has been exchanged for a replacement.

Figure 22:
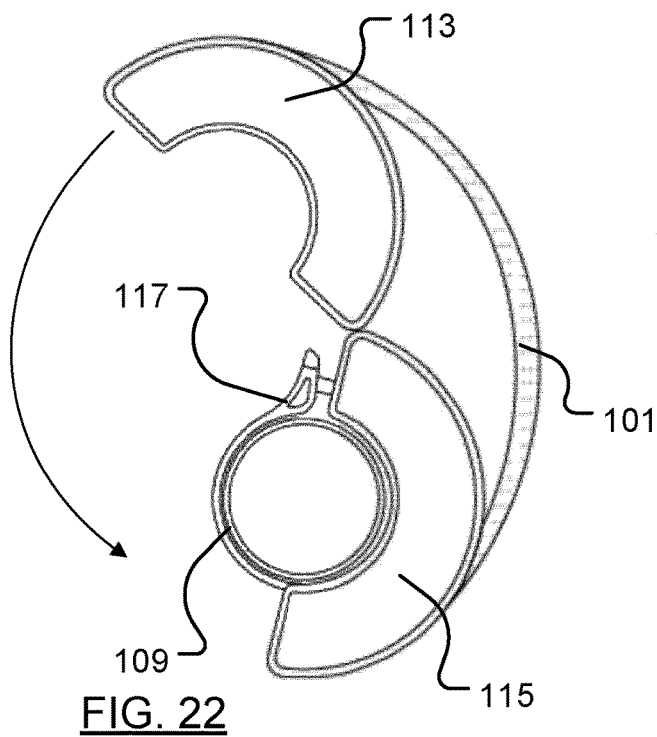
FIGS. 22 to 25 are various top plan views of the apparatus in several different stages of the assembly process.
Figure 23:
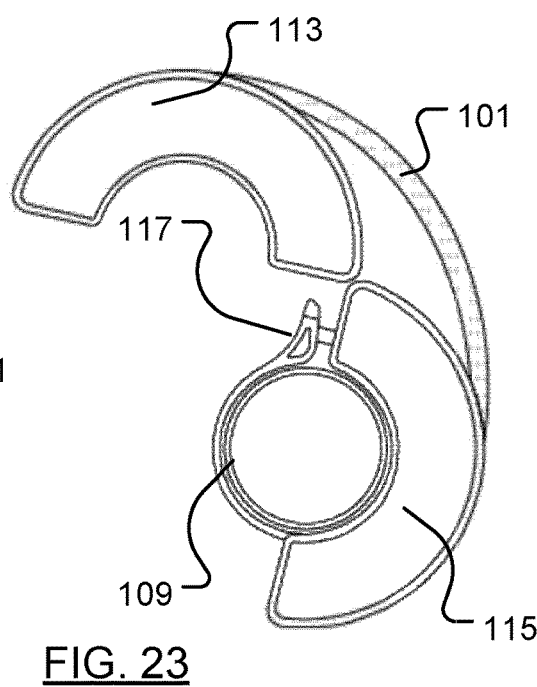
Figure 24:
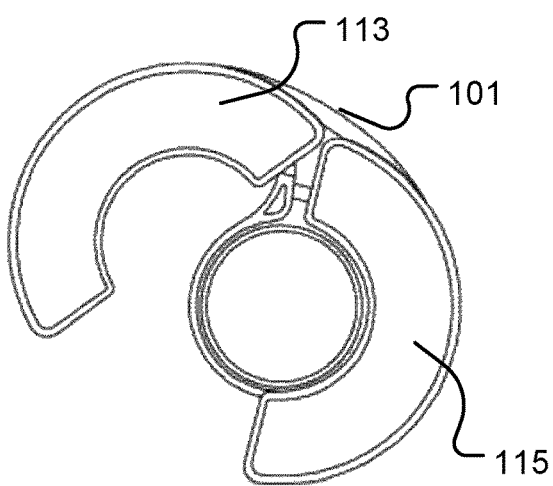
Figure 25:
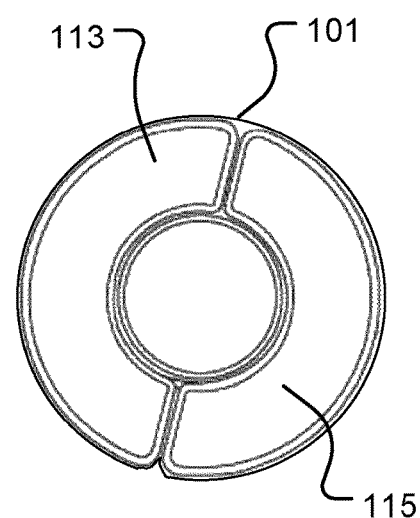

FIG. 22 is a schematic top plan view of the apparatus with the clamshell open and the cover 101 secured to the internal surfaces of the first and second support members 113, 115. As shown, the cover is relatively loosely mounted on the support. As the clamshell is progressively closed by moving the two support members together, so the spacing between the cover 101 and the support members 113, 115 reduces (as shown in FIGS. 23 and 24), until the support members 113, 115 are adjacent one another (i.e. the clamshell is closed) and the cover is tightly wrapped and tensioned around the exterior of the support. In this way a user can effectively tension the cover on the support simply by closing the clamshell.

Figure 26:
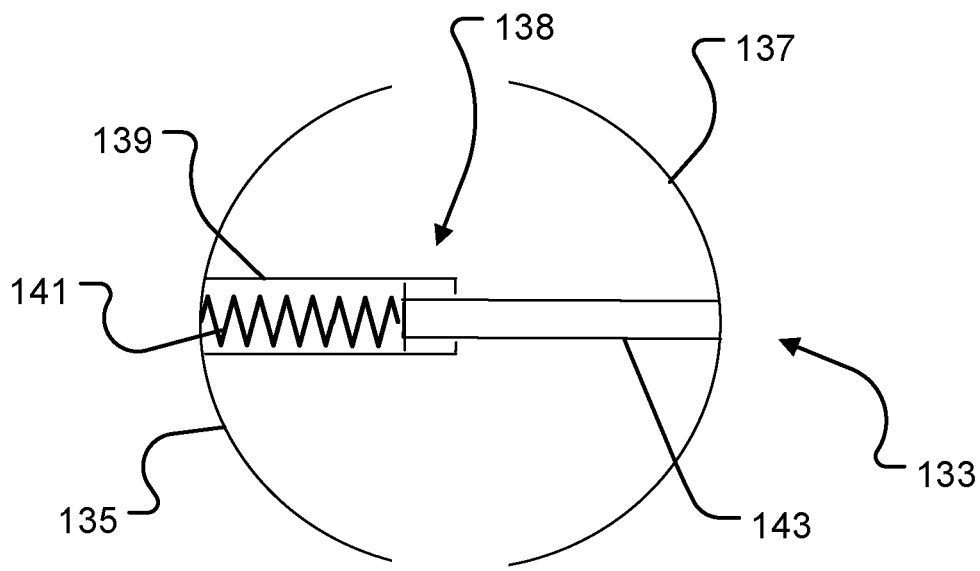
FIG. 26 is a diagrammatic sectional view of apparatus according to a third embodiment of the present disclosure.

FIG. 26 is a diagrammatic cross-sectional view of scratching apparatus according to a third embodiment of the present disclosure. The scratching apparatus 133 comprises first and second support members 135, 137 that are coupled together by a coupling formation 138. The coupling formation comprises the following features: one support member, in this instance the first support member 135, includes a tube 139 that extends from an internal surface of the support member. A resilient bias, for example a helical spring 141, is provided within the tube. A plunger 143 extends from an internal surface of the second support member 143 and is moveable into the tube 139 against the resilient bias. The plunger 143 includes a circumferential lip in the vicinity of an end of the plunger distal from the second support member and the tube 139 is narrowed in the vicinity of an end of the tube 139 distal from the first support member, the arrangement being such that the plunger is restrained from being removed from the tube.

In this arrangement the support members can be brought together against the action of the resilient bias (for example by pushing them together), and a tubular scratchable cover (not shown)—for example of the type shown in FIG. 2—can be slid onto the support. Once the scratchable surface is in place, the resilient bias acts to drive the support members apart and hence tensions the cover on the support. It is anticipated that so long as the force exerted by the resilient bias is larger than the force that might be exerted on the cover by a cat, for example, scratching against it; then the resilient bias will continue to tension the cover around the support members whilst the apparatus is in use.

It is envisaged that one or more coupling formations may be provided to couple the first and second support members together. For example, one coupling formation may be provided in the vicinity of either end of the support members.

It will be appreciated that whilst various aspects and embodiments of the present disclosure have heretofore been described, the scope of the present disclosure is not limited to the particular arrangements set out herein and instead extends to encompass all arrangements, equivalents, modifications and alterations thereto, which fall within the scope of the appended claims. For example, whilst in the first embodiment described above it is the case that both support members can move relative to the base, it will be apparent to persons skilled in the art that this arrangement is not essential. Rather, it is possible for one support member to be fixed to the base and the other to move relative to the base.

It should also be noted that whilst the accompanying claims set out particular combinations of features described herein, the scope of the present disclosure is not limited to the particular combinations hereafter claimed, but instead extends to encompass any combination of features herein disclosed.

Finally, it should be noted that any element in a claim that does not explicitly state "means for" performing a specified function, or "steps for" performing a specific function, is not to be interpreted as a "means" or "step" clause as specified in 35 U.S.C. Sec. 112, par. 6. In particular, the use of "step of" in the claims appended hereto is not intended to invoke the provisions of 35 U.S.C. Sec. 112, par. 6.

The invention claimed is:

1. Scratching apparatus comprising:
   a support for a scratchable cover, wherein the support comprises a plurality of support members, the support being reconfigurable between first and second states, wherein in said first state a scratchable cover supported by said support is loosely mounted on said support and in said second state said scratchable cover is tensioned around the support, the plurality of support members being such that reconfiguring said support from said first state to said second state causes at least one of said support members to move relative to another support member to tension the scratchable cover around the support, and reconfiguring said support from said second state to said first state causes at least one of said support members to move relative to another support member to loosen the scratchable cover mounted on the support, wherein each support member is generally semi-circular in a transverse cross-section; and
   at least one coupling formation for coupling a first support member to a second support member of said plurality of support members, wherein said at least one coupling formation includes a wedge having an inclined side, said wedge being provided between said first support member and said second support member, said wedge being moveable so that the inclined side of said wedge bears upon a complementary inclined side of one of said first and second support members to drive for driving said first and second support members apart to tension said scratchable cover for use as the scratching apparatus.

2. Scratching apparatus according to claim 1, wherein reconfiguring said support from said first state to said second state causes at least one of said support members to move relative to another support member to increase spacing between the support members and thereby tension the scratchable cover mounted on the support.

3. Scratching apparatus according to claim 1, wherein reconfiguring said support from said second state to said first state causes at least one of said support members to move relative to another support member to reduce the spacing between the support members and thereby relax the scratchable cover mounted on the support.

4. Scratching apparatus according to claim 1, comprising a base, said support being coupled to said base.

5. Scratching apparatus according to claim 4, wherein said support is coupled to said base in such a way that said first and second support members can both move relative to said base.

6. Scratching apparatus according to claim 1, wherein said wedge is coupled to a retainer in such a way that movement of the wedge away from the retainer enables the support members to be moved closer to one another.

7. Scratching apparatus according to claim 1, wherein said plurality of support members are moveably coupled to one another.

8. Scratching apparatus according to claim 1, wherein said scratchable cover comprises a tubular body sized to fit over said support, said tubular body having an external face and an internal face, said external face comprising a scratchable surface.

9. Scratching apparatus comprising:
   a support for a scratchable cover, the support comprising first and second support members, said first and second support members being moveably coupled to one another, and each of said first and second support members is being generally semi-circular in a transverse direction,
   wherein:
      said support is reconfigurable between first and second states,
      in said first state a scratchable cover supported by said support is loosely mounted on said support and in said second state said scratchable cover is tensioned around the support,
      the first and second support members being such that:
      reconfiguring said support from said first state to said second state causes one of said first and second support members to move relative to the other of said first and second support members to tension the scratchable cover around the support, wherein a wedge, having an inclined side, is provided between said first support member and said second support member and is moveable so that said wedge inclined side bears upon a complementary inclined side of one of said first and second support members to drive said first and second support members apart to tension the scratchable cover around the support, and
      reconfiguring said support from said second state to said first state causes one of said first and second support members to move relative to the other of said first and second support members to loosen the scratchable cover mounted on the support.

10. Scratching apparatus according to claim 9, wherein the scratchable cover is a tubular body sized to fit over said support, said tubular body having an external face and an internal face, said external face comprising a scratchable surface.

11. Scratching apparatus comprising:
    a support for a scratchable cover, the support comprising a first support member and a second support member, said first and second support members each being generally semi-circular in transverse cross-section, said first and second support members being arranged so that said support is generally circular in transverse cross-section, said first and second support members being moveably coupled to one another, said first and second support members each including an inclined internal side; said first and second support members being arranged so that said respective inclined internal sides form a generally V-shaped recess between said first and second support members; and
    a wedge, said wedge having first and second oppositely inclined external sides so that said wedge is generally triangular in transverse cross-section, said wedge being moveable into and out of said generally V-shaped recess between said first and second support members;
    wherein said support is reconfigurable between a first state in which a scratchable cover supported by said support is loosely mounted on said support and a second state in which said scratchable cover is tensioned around the support, the first and second support members being such that:
  moving said wedge into said V-shaped recess to reconfigure said support from said first state to said second state causes said first inclined external side of said wedge to bear upon the inclined internal side of said first support member and the second inclined external side of said wedge to bear upon the inclined internal side of said second support member thereby causing said wedge to drive said first and second support members apart to tension the scratchable cover around the support; and
  moving said wedge out of said V-shaped recess to reconfigure said support from said second state to said first state causes said wedge to move away from said first and second support members to permit the first and second support members to move to loosen the scratchable cover mounted on the support.

12. Scratching apparatus according to claim 11, wherein said wedge has a triangular shape that is complementary to said V-shaped recess.

\* \* \* \* \*